United States Patent
Douvikas et al.

(10) Patent No.: US 6,889,213 B1
(45) Date of Patent: May 3, 2005

(54) E-SERVICE TO MANAGE CONTACT INFORMATION WITH PRIVACY LEVELS

(75) Inventors: James G. Douvikas, Danville, CA (US); Terry R. Sheehy, Mountain View, CA (US); Christopher W. T. McKay, Paddington (AU)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/507,215

(22) Filed: Feb. 18, 2000

(51) Int. Cl.$^7$ .............................................. G06F 17/60
(52) U.S. Cl. ............................ 705/67; 705/69; 705/1; 707/10; 707/9; 707/1
(58) Field of Search .............................. 705/64, 67, 1; 707/1, 9, 10

(56) References Cited

U.S. PATENT DOCUMENTS

| | | | | |
|---|---|---|---|---|
| 5,231,578 A | * | 7/1993 | Levin et al. ................. | 715/512 |
| 5,778,367 A | * | 7/1998 | Wesinger et al. ............. | 707/10 |
| 5,848,412 A | * | 12/1998 | Rowland et al. .............. | 707/10 |
| 5,903,878 A | * | 5/1999 | Talati et al. ................... | 705/26 |
| 5,940,478 A | * | 8/1999 | Vaudreuil et al. ............. | 379/17 |
| 5,962,829 A | * | 10/1999 | Yoshinaga ................... | 235/375 |
| 6,073,138 A | * | 6/2000 | de l'Etraz et al. ........ | 707/104.1 |
| 6,122,642 A | * | 9/2000 | Mehovic ................... | 707/104.1 |
| 6,138,908 A | * | 10/2000 | Moon et al. ................. | 235/375 |
| 6,157,954 A | * | 12/2000 | Moon et al. ................. | 379/219 |
| 6,208,659 B1 | * | 3/2001 | Govindarajan et al. ..... | 370/410 |
| 6,633,311 B1 | * | 10/2003 | Douvikas et al. ........... | 345/731 |

FOREIGN PATENT DOCUMENTS

JP    2002215254    *    7/2002    ............. G06F/1/00

OTHER PUBLICATIONS

Microsoft SQL Server 6.5 Unleashed, David W. Solomon, Ray Rankins; 1998; Chapter 12.*

Vcard, The electronic business card; Sep. 18, 1996; VERSIT Consortium specification.*

WSD Application notes, Oct. 1999.*

* cited by examiner

*Primary Examiner*—James P. Trammell
*Assistant Examiner*—John M Winter

(57) ABSTRACT

A method of providing an electronic business card (EBC) access and organization service on the Web. The cardholder database is accessible and searchable from any browser connected to the Internet or the EBC service may be installed behind a conventional firewall and thus accessible only to intranet users. The service thus provides easy access to cardholder contact information with privacy assured by use of integrated access restrictions. Access to and delivery of contact information by the service is not limited to a Web browser interface as commonly known today. The service provides multi-mode access and/or data delivery interfaces. The service also provides an export feature that formats search results into a pre-defined file structure readable by a conventional contact management programs. Custom export file formats may also be defined provide even wider connectivity and cross-platform utility. Access to individual records is controlled at both the record level and the field level, with multiple privacy levels for each field, in addition to the well-known "public" and "private" levels. Users having certain permissions are permitted to read a defined group of records, though not necessarily all fields in each record. A location tracking feature is also provided to allow the cardholder to rapidly designate a pre-defined contact location. Alternately, the cardholder may define a temporary contact location not normally stored in the database system. Electronic mail sent by the cardholder is automatically formatted to contain a signature hypertext link directing recipients of the email to the EBC service. This hyperlink enables the recipient of the email to rapidly access the EBC system to locate the cardholder and/or obtain additional information.

64 Claims, 22 Drawing Sheets

New User Bottom:

Address 2:
[Home ▼]

City:
State/Province:
Zip/Postal:
Country:

Key: 🔒 🔒 🔓

Phone:
[Bus. Phone ▼]
[Bus. Fax ▼]
[Cell Phone ▼]
[Pager ▼]
[Home Phone ▼]

Email:
[Business ▼]
[Home ▼]

Email Auth: ⎯750
This is the email address ECardFile uses for administrative purposes. It will not be displayed on your card.

( Okay )  ( Cancel )
730⎯         ⎯740

⎯390
710  terms of use    © 1999 Hewlett-Packard Company    privacy
⎯310

Fig. 7B

E-SERVICE TO MANAGE CONTACT INFORMATION WITH PRIVACY LEVELS

CROSS-REFERENCE TO MICROFICHE APPENDIX

A portion of the disclosure of this patent document contains material which is subject to copyright protection. The copyright owner has no objection to the facsimile reproduction by anyone of the patent document or the patent disclosure, as it appears in the patent and trademark office patent file or records, but otherwise reserves all copyright rights whatsoever.

BACKGROUND OF THE INVENTION

1. Field of the Invention

The present disclosure relates to electronic commerce, more specifically electronic storage and retrieval of information.

2. Description of the Related Art

The ordinary paper business card has become ubiquitous worldwide. Social rituals have even developed concerning the exchange and scrutiny of these small slips of cardboard. By some estimates, billions of business cards change hands every day, yet the cards themselves have numerous shortfalls. Each business card contains only static information on the cardholder, i.e., the person for whom the card was printed and whose name is on the card. Business cards must be reprinted every time any cardholder information (such as a phone number, electronic mail [email] address, or title) changes. Business cards consume not inconsequential amounts of space, yet lack an inherent card-to-card organization. Thus, it can be difficult to retrieve information from a stack of cards, especially if that stack numbers in the hundreds or thousands of cards.

Privacy of information is also a growing issue among modern business people. By definition, the information on a card is public, yet other information (such as a mobile or home phone number) is necessarily shared with some acquaintances. In such situations, the cardholder or recipient must fumble for a pen and the additional data must be dictated and captured.

Dynamic access to the cardholder by others is not addressed by the prior art business card, as it only shows static location information as of the last printing of the card. Thus, if a business person is based in Huntington, N.Y. but happens to be traveling to San Jose, Calif., that person's business card will not reflect the California address or phone numbers.

Electronic means of capturing and storing conventional business card data are currently known. Examples of this technology include card scanners, personal digital assistant (PDA) devices and related software, electronic address books, commercial email programs such as Microsoft Outlook having their own electronic address books, "smart phones" or PDA/wireless communication device hybrids, Internet (also referred to as the World Wide Web, or simply "Web") based contact organizers, and the like. This technology all suffers from the same limitation in that it generally lacks multi-level privacy for users and cardholders, it cannot help locate the cardholder, it (generally) lacks the ability to seamlessly export to or import from other database systems, and (with the possible exception of some prior art Web-based contact organizers) it lacks centralized control and universal access.

What is needed is a widely-accessible electronic service and method for organizing contact information entered by cardholders, including but not limited to all of the information on a standard business card. This service must provide for the ability to export data to standard databases. Privacy of information should be configurable at an information record and field level by the cardholder so that access to some records and some fields in all records can be denied to certain people while access to other records and fields is still allowed. A location feature to allow service users to determine how to best reach a listed cardholder at a given time is also desirable. A dynamic electronic link, such as the well-known Internet hyperlink, is also needed to connect the recipients of email from a cardholder to the service.

SUMMARY

In one embodiment of the present invention, an electronic business card (EBC) access and organization system operates from a Web-based computer system that includes a database and software for managing access, data privacy, and dynamic updates. The cardholder database, i.e., the database containing records of each registered cardholder (or "Member" of the EBC system), is accessible from any Web browser connected to the Internet. Examples of such common Web browsers are Microsoft's Internet Explorer and Netscape® Navigator®. In an alternate embodiment, the EBC system may be installed behind a conventional network "firewall" security device and thus made accessible only to browsers connected to and authorized to use the intranet defined by and behind the firewall.

Access to and delivery of contact information in the EBC system is not limited to a Web browser interface as commonly known today. Some embodiments of the present invention provide multi-mode access interfaces, including but not limited to interfaces using voice-controlled and conventional wireless PDA and/or cell phones, two-way pagers, and wireless access protocol (WAP)-enabled devices. Further embodiments of the present invention provide data delivery interface embodiments using, for example, the common alphanumeric pager, wireless markup language (WML), or voice delivery (e.g., audio playback) systems commonly used in the art.

Users (those desiring access to one or more cardholder records) are permitted to search for cardholder information. Access to individual records is controlled at both the record level and the field level. Users having certain permissions (set by the cardholder) are permitted to read a defined group of records, though not necessarily all fields in each record. Thus, a cardholder may make her business information available to all users (or all users in a defined group or groups, such as "Aerospace Engineers" or "Family"), but keep certain information, such as her cellular phone number, private to all but a few individuals. Access control is implemented, in some embodiments of the present invention, with multiple privacy levels for each field, in addition to the well-known "public" and "private" levels. In these embodiments, the cardholder can specify the degree of privacy associated for each field. For example, a cellular phone number may be designated as semi-private and thus available to only those defined users granted "semi-private" access to the cardholder's data. In an alternate embodiment, more than three privacy levels are defined, allowing even more degrees of privacy and finer-grained access control.

BRIEF DESCRIPTION OF THE DRAWINGS

The present disclosure may be better understood and its numerous features and advantages made apparent to those skilled in the art by referencing the accompanying drawings.

The use of the same reference symbols in different drawings indicates similar or identical items.

DETAILED DESCRIPTION

Introduction

The electronic business card (EBC) access and organization system consists of a hardware complex providing the physical interface to the Internet, firewall security, web server functionality, data storage, and system redundancy protection. The hardware is controlled and operated by computer instructions (i.e., software) in various forms, including but not limited to microcode, firmware, assembly and other high-level language modules. The EBC system is the integration of the hardware and software elements to perform the functions and provide the features noted in the Summary above.

Hardware Platform

Figure 1:
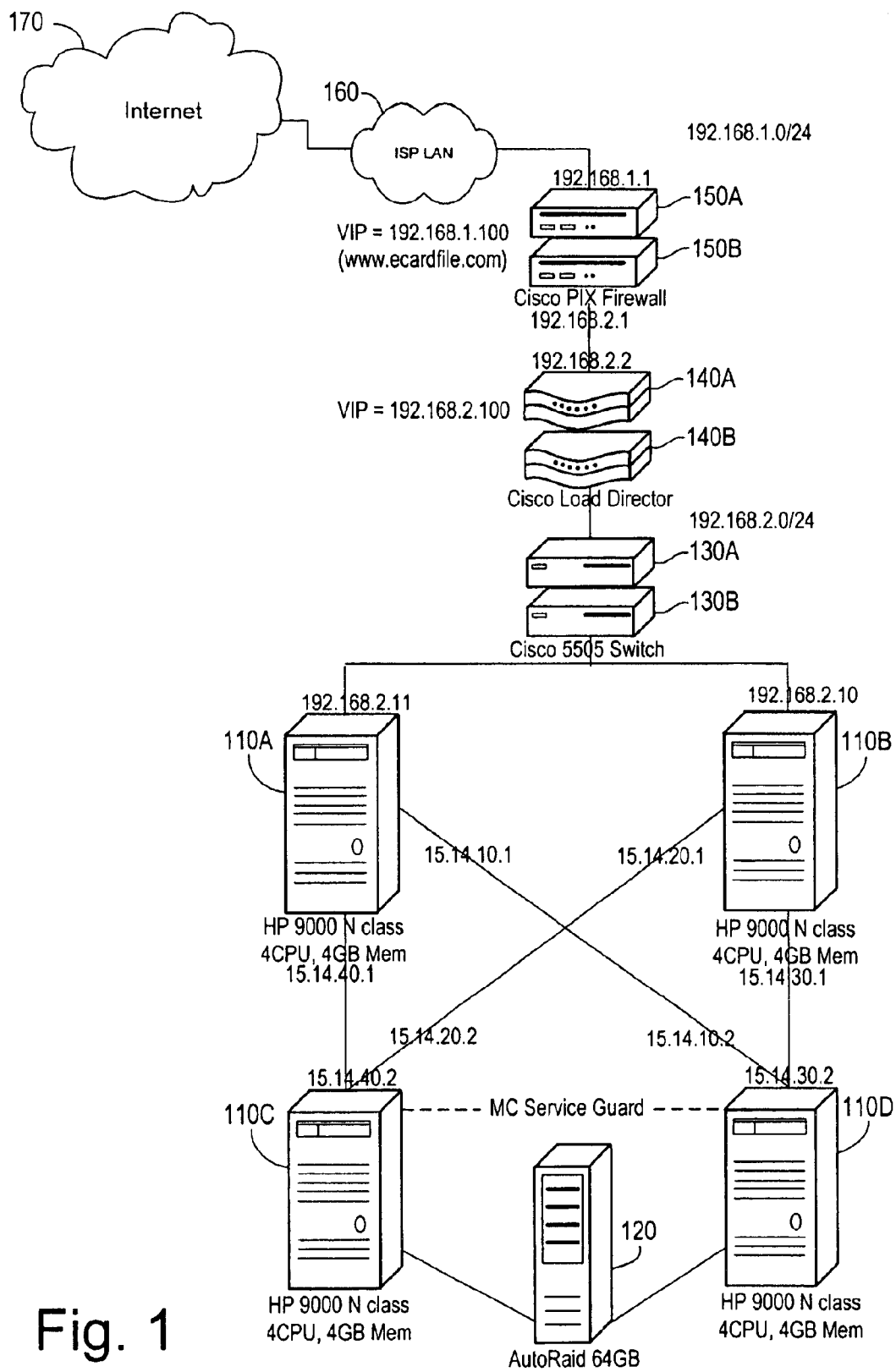
FIG. 1 is a high-level schematic of the hardware platform, according to one embodiment of the present invention.

In one embodiment of the present invention, the EBC access and organization system (also referred to as ecardfile™, the Hewlett-Packard® product embodying a certain aspect of the present invention) is run on 4 N-class Hewlett-Packard 9000 computers 110, as shown in FIG. 1. These computers are configured, in one embodiment, with 4 Gigabytes (GB) of memory and 4 processors, running the HP-UX® operating system version 11.0. Other memory/processor/operating system configurations are also possible. There are two front-end web servers (10A and 110B) talking to a database server (110C) that has access to one or more shared automatic redundant arrays of inexpensive disk drives (RAIDs) 120, each RAID having 64 GB of memory. Warm fail-over server (110D), which uses in one embodiment MC-Service Guard™, a Hewlett-Packard product, protects database server 110C.

Although an N-class Hewlett-Packard 9000 is described, those skilled in the art will realize that servers other than the N-class Hewlett-Packard 9000 can be used. Accordingly, the invention is not limited to any particular type or brand of server.

Web Servers

The two front-end web servers 110A and 110B are served by a two Cisco Systems®, Inc. Catalyst™ 5505 switches 130A and 130B, which are served by two Cisco Local Director™ units 140A and 140B, which in turn are server by two Cisco PIX® Firewall units 150A and 150B. The firewall units 150 connect through an internet service provider (ISP) local area network (LAN) 160 to the Internet 170.

The web servers are running, in one embodiment of the present invention, the Stronghold® Apache web server operating program, available from C2Net, Inc. This is a 128 bit secured web server. Other commercially-available server operating programs are also useable.

The Local Director units 140A and 140B load balance the incoming requests to the two web servers 110A and 110B by switching packets in switches 130A and 130B.

The web content (resident in web servers 110A and 110B) is dynamically built with the aid of server-side Java™ applications known as servlets. The JRun™ servlet engine (in one embodiment of the present invention, version 2.3, build 145) executes these servlets, with the aid of a dynamic loaded module within the Apache web server operating program. The servlets are written to conform to the Java Servlet Development Kit API v2.1, available from Sun Microsystems, in order to properly interface with the Apache web server software.

The biggest advantage in using servlets as opposed to other web development tools is performance. A single Java virtual machine (in one embodiment of the present invention, the HP-UX Java Virtual Machine version 1.1.8.1) runs on the server and the servlet is loaded once when it is called. It is not loaded again until the servlet changes, and a modified servlet can be re-loaded without restarting the server. The servlet stays resident in memory and is very fast. Static or persistent information can be shared across multiple invocations of the servlet, allowing the sharing of information between multiple users. For instance, a single database connection can be use by multiple browser requests.

Database Server

The database servers 110C and 110D run, in one embodiment of the present invention, Informix® Dynamic Server® Version 7.31.UC4. Other database server software packages and versions are also useable. Access to the database is via the industry standard JDBC applications programming interface (API) and Informix' JDBC drivers (in one embodiment of the present invention, driver version 1.40.JC2). The use of JDBC ensures scalability and database and platform independence.

User Interaction

Figure 2:
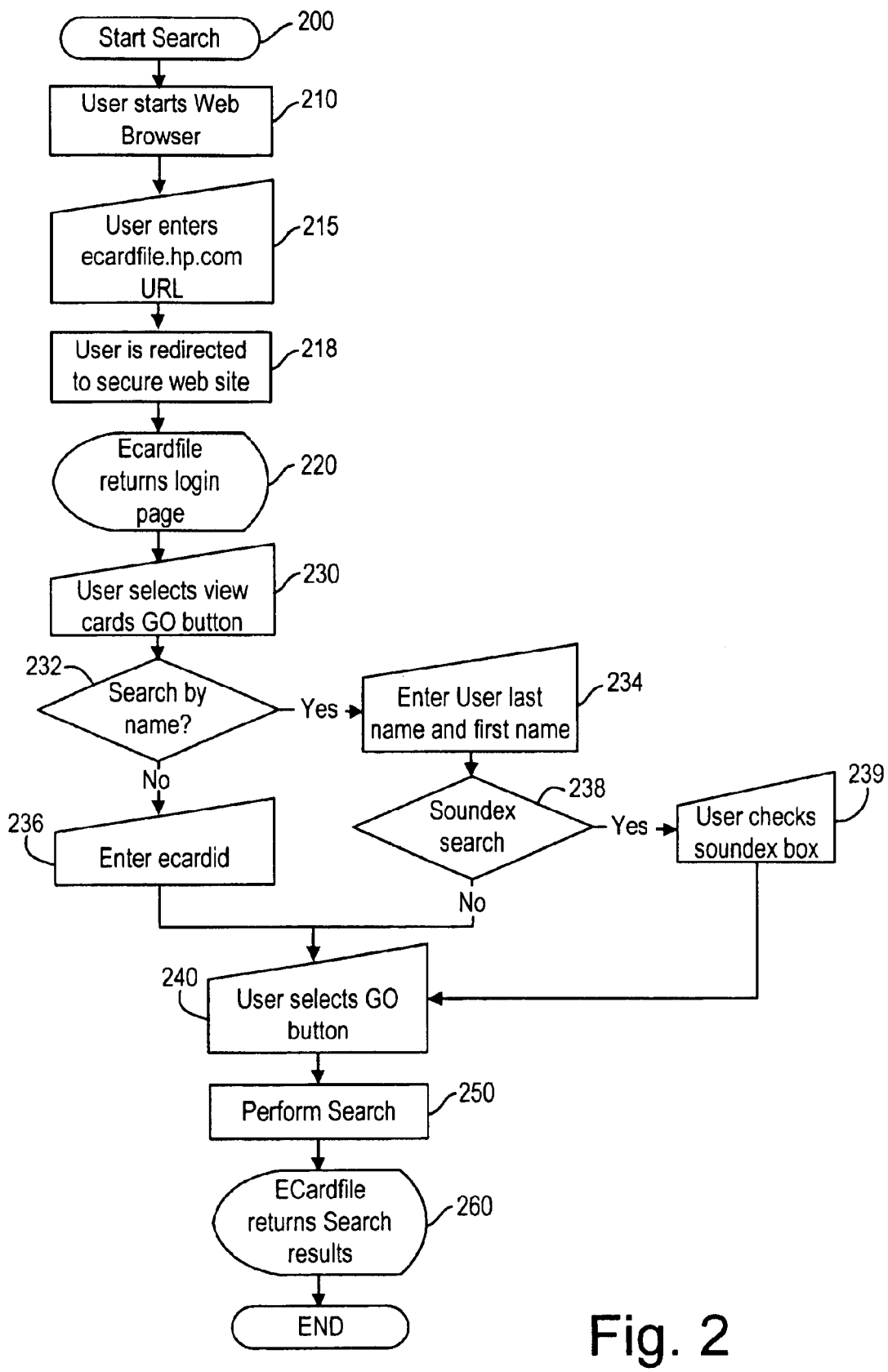
FIG. 2 is a flowchart of the "Search" process, according to one embodiment of the present invention.

A user's interaction with the ecardfile EBC system, according to one embodiment of the present invention, is illustrated in FIG. 2. This flowchart shows a typical use of the EBC system to perform a search on cardholder data. Note that, in some embodiments, the user need not be a registered Member of the ecardfile system. In an alternate embodiment, only registered Members can use the system.

Interaction begins at step 200. The user starts a conventional Web browser, such as Internet Explorer or Netscape Navigator, 210, and enters the ecardfile Uniform Resource Locator (URL) 215. This URL is the Internet address of the EBC system hardware described above and is defined, disseminated, and maintained through means well-known in the art. Upon receipt and processing of the URL by Internet 170 (generally speaking), the user's browser is redirected to a secure web site 218 by conventional techniques common in the art.

Figure 3A:
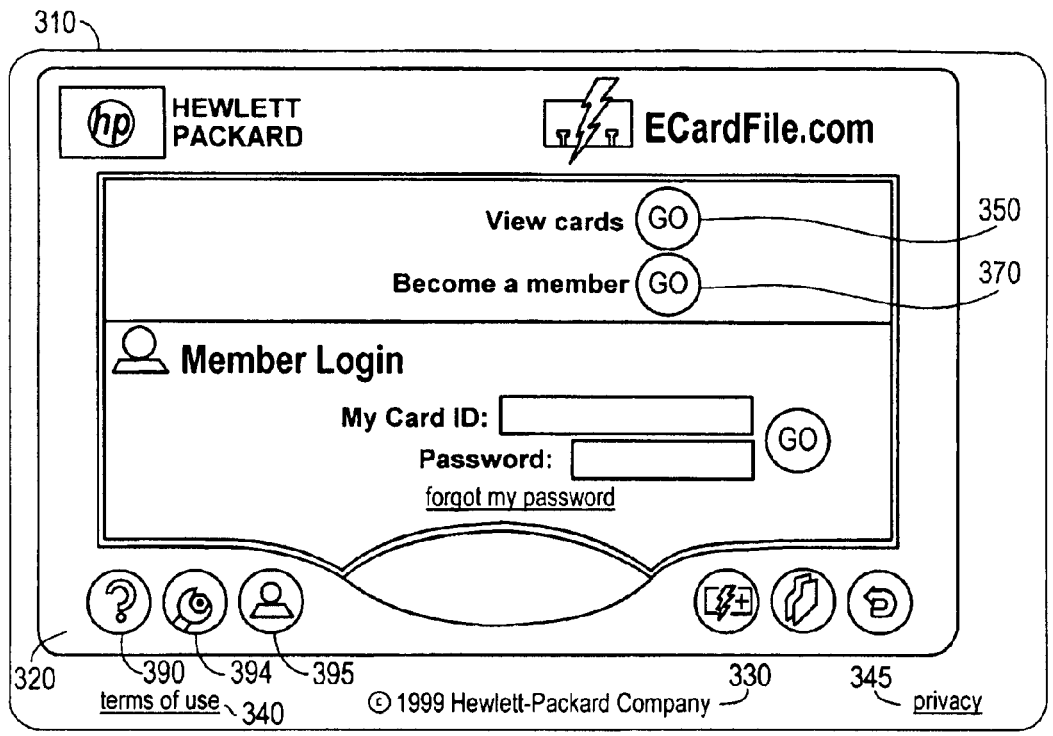
FIG. 3A is a screen shot of the Member Login display, according to one embodiment of the present invention.

Once connected, ecardfile returns the web browser codes (e.g., HTML) to the user to display the Member Login screen, shown in one embodiment in FIG. 3A. The Member Login screen display consists of window 310 containing the ecardfile login graphic 320, copyright notice 330 and hyperlinks 340 and 345, to a terms of use page and a privacy statement, respectively.

Figure 3B:
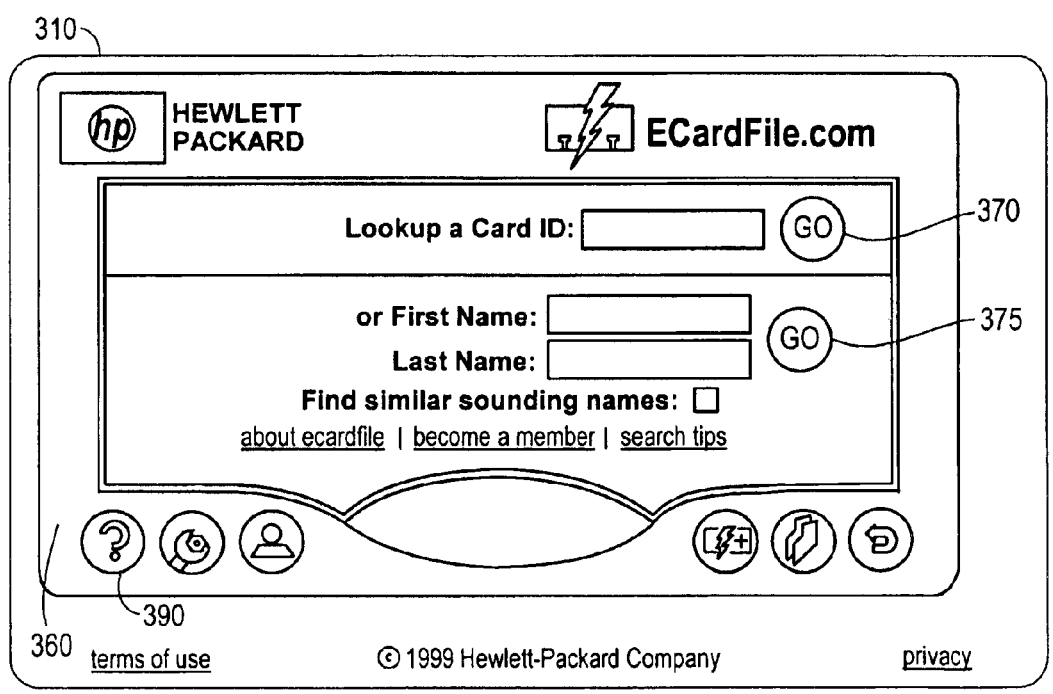
FIG. 3B is a screen shot of the Search display, according to one embodiment of the present invention.

In step 230 of FIG. 2, the user selects the "Go" button (350) associated with the "View Cards" command in login graphic 320. This selection brings up search screen 360 (FIG. 3B) in window 310. In one embodiment of the present invention, the user is given the choice 232 of searching by cardholder name 234 or ecardfile ID number 236, a multi-digit number or multi-character alphanumeric value representing a cardholder. If the user selects lookup by name, the user is given the further choice 238 of searching by similar sounding names using, for example, the SoundEx software toolbox. In the latter case, the user checks check box 365 to conduct a sounds-like search.

Figure 4:
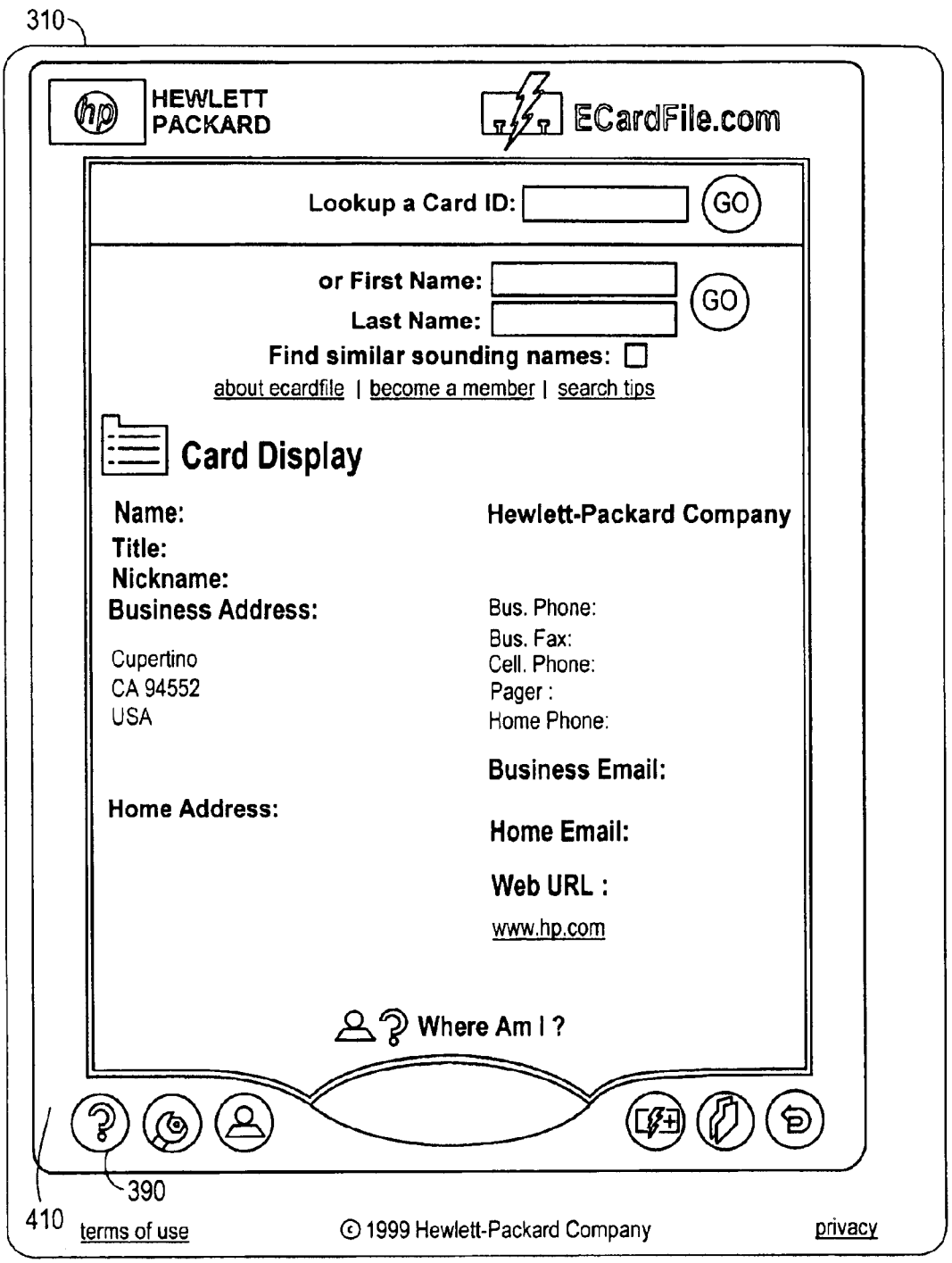
FIG. 4 is a screen shot of the Card Display screen, according to one embodiment of the present invention.

The search begins 250 when the user selects the "Go" button 370 or 375 corresponding to the type of search desired in step 240. The EBC system returns results 260 in the Results Screen 410 shown in FIG. 4. This screen replaces search screen 360 in window 310.

Figure 5:
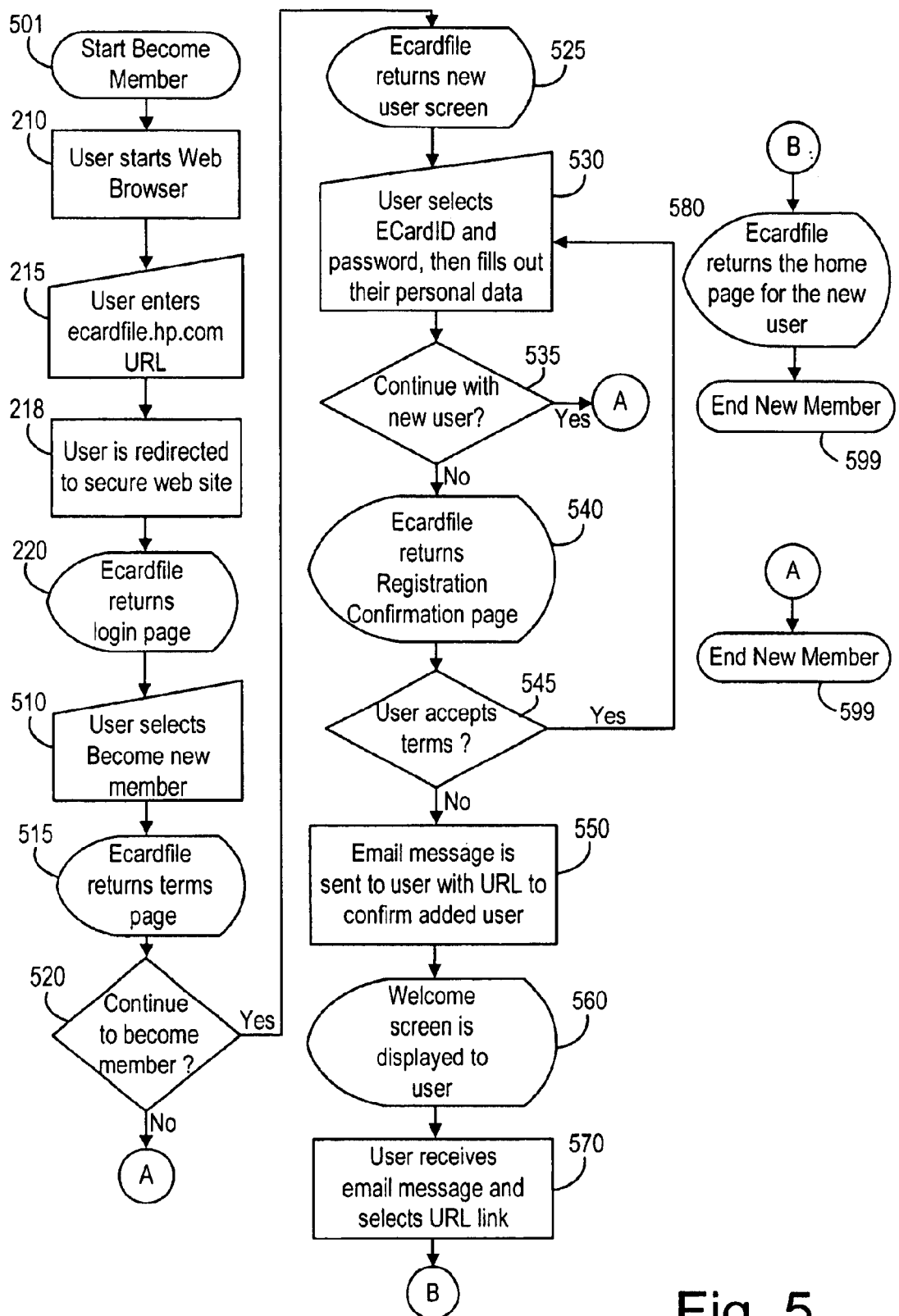
FIG. 5 is a flowchart of the "Become New Member" process, according to one embodiment of the present invention.

A user may chose, at step 220 of FIG. 2, to become a Member of the ecardfile user community, rather than performing a search. In this case, the interaction follows the flowchart of FIG. 5 instead. The process begins in step 501. The user starts a Web browser 210 and visits the ecardfile login screen 320 as before (steps 215, 218, and 220). Here, however, the user selects the "Become New Member" button 370 (FIG. 3A) in step 510.

Figure 6:
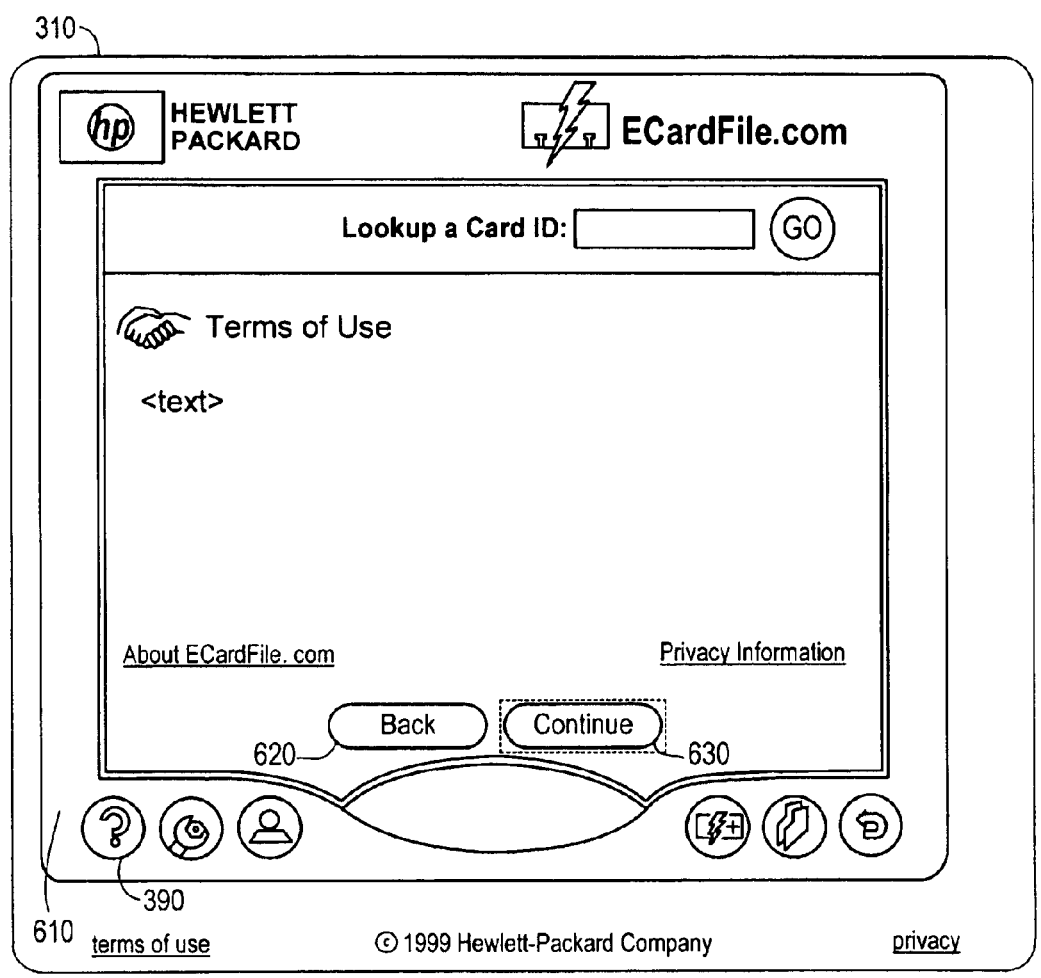
FIG. 6 is a screen shot of the Terms & Conditions display, according to one embodiment of the present invention.

This selection brings up Terms screen 610 (FIG. 6) in window 310 (step 515). The user is then given choice 520 to go back to login screen 320 (which ends the "Become New Member" process, step 599) or to continue the process to step 525. Choice 520 is implemented, in one embodiment of the present invention, using Back button 620 and Continue button 630.

Figure 7A:
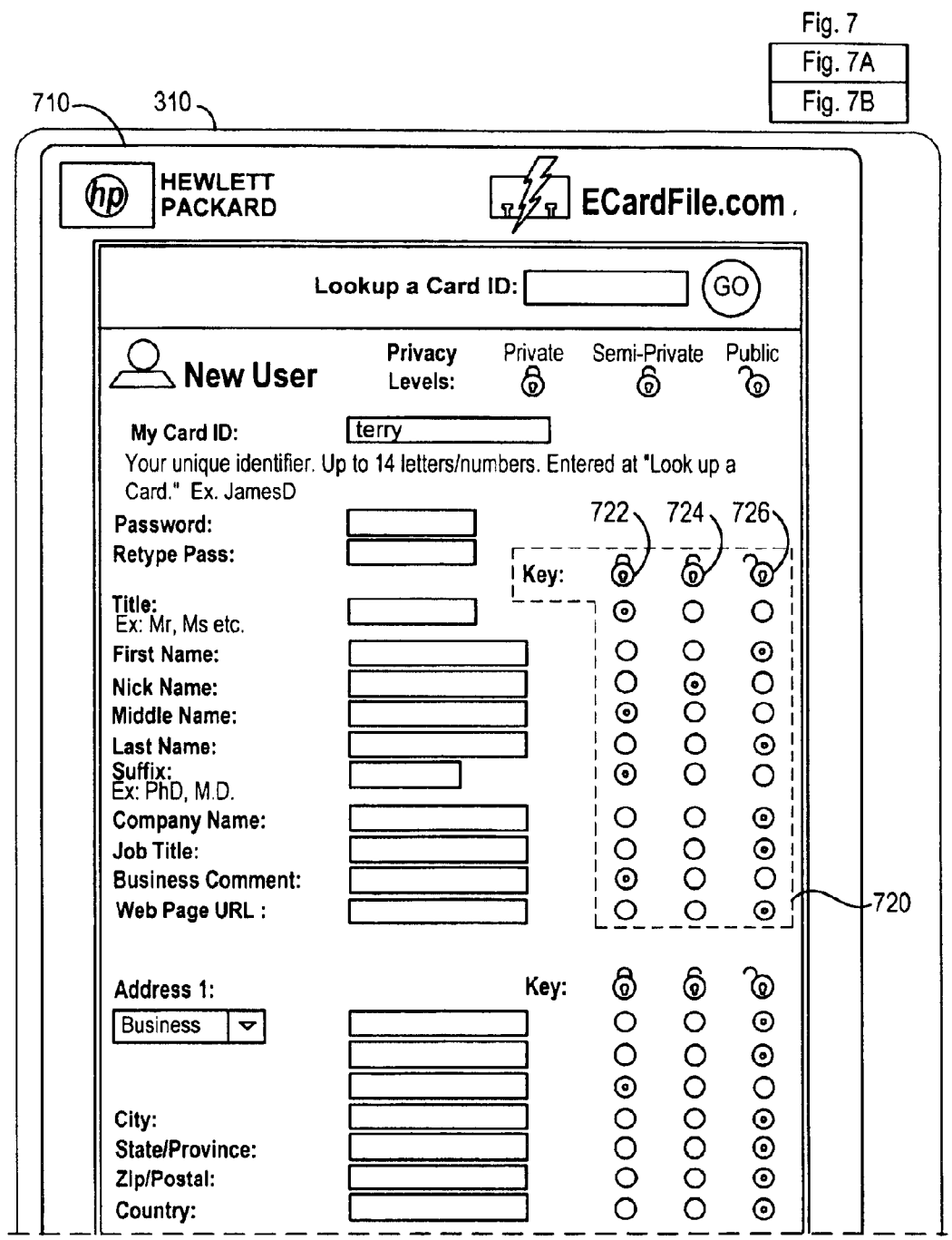
FIG. 7 is a screen shot of the New User data entry display, according to one embodiment of the present invention.

The selection of Continue button 630 brings up, in step 525, New User data entry screen 710 in window 310 (shown in FIGS. 7A and 7B). The user selects an ecardfile ID and password and fills out the personal data using conventional data entry means for any of the well-known access devices and systems discussed above, such as using a keyboard or a voice-controlled (audio) prompt and response scheme. Privacy levels 720 are also set by the user for each field in the user (soon-to-be Member and Cardholder) data record. In one embodiment, depicted in FIGS. 7A and 7B, three privacy levels are possible: Private, denoted by the locked padlock icon 722; Semi-Private, denoted by the partially-locked icon 724; and Public, denoted by the open lock icon 726. Public and Private privacy levels represent the familiar "all access" and "no access" privacy settings known in the art. Semi-Private privacy represents a level of access granted only to certain members of the public, such as a predefined group of users designated by the Member or by a EBC system administrator. Non-designated users do not have access to Semi-Private fields.

Although a three-level (Private, Semi-Private, and Public) privacy scheme is described, those skilled in the art will realize that privacy (or security) schemes implemented in more than three levels can be used. For example, a variety of different user groups can be defined with exclusive Semi-Private access given to some groups over others on a field-by-field basis. Accordingly, the invention is not limited to any particular number of privacy levels.

Figure 8:
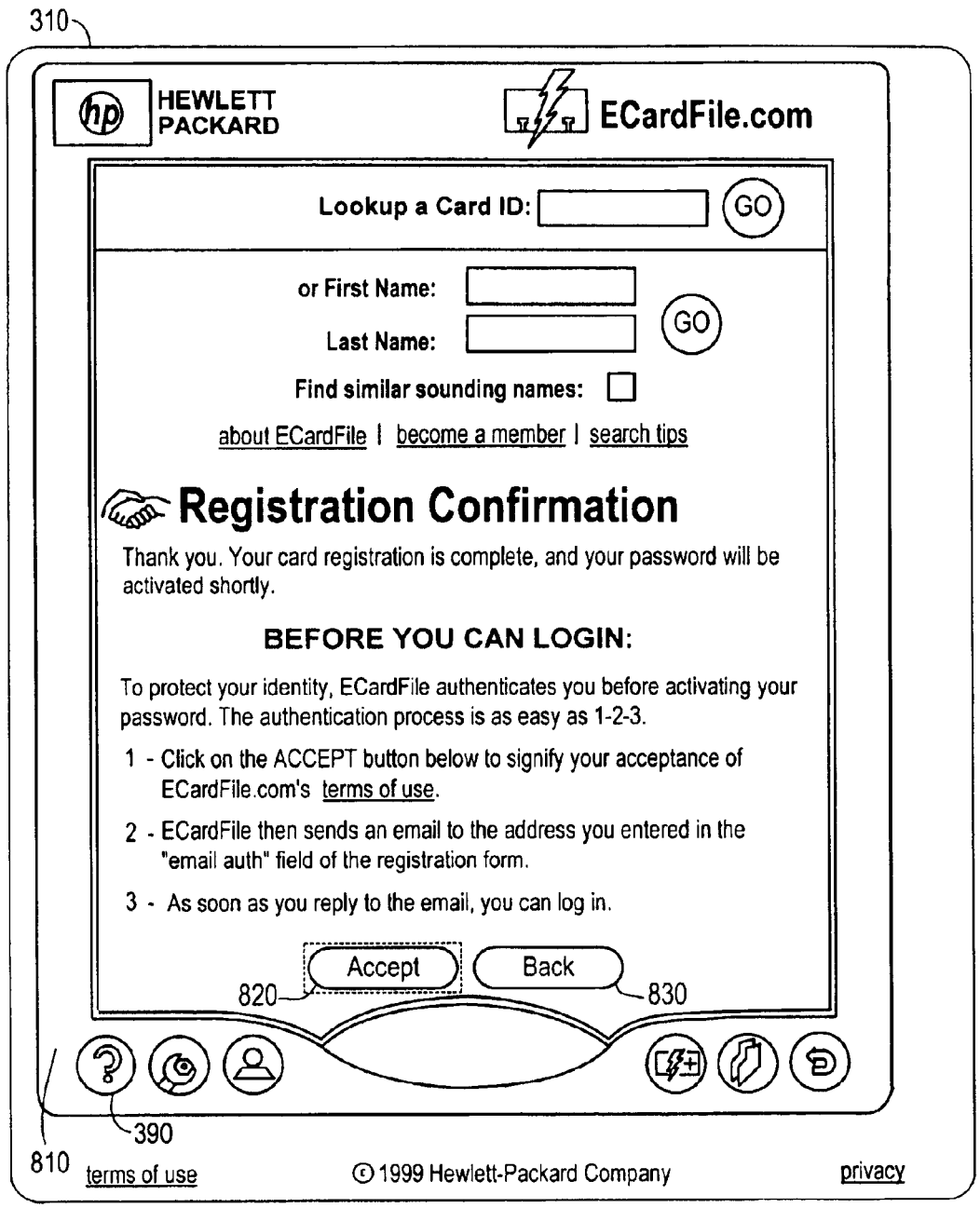
FIG. 8 is a screen shot of the Registration Confirmation display, according to one embodiment of the present invention.

Once all requested information has been entered (or left blank, where optional as defined by the EBC system), the user chooses to continue or not at step 535. If the user decides not to continue by pressing Cancel button 740 (FIG. 7B), the process ends at step 599. If, however, the user chooses Okay button 730, the system displays a Registration Confirmation page 810 (FIG. 8) in window 310. Here the user is given the choice 545 to accept the terms of use of the EBC system (via Accept button 820) or to go back (via Back button 830) to step 530 to edit personal data or enter additional data.

Figure 9:
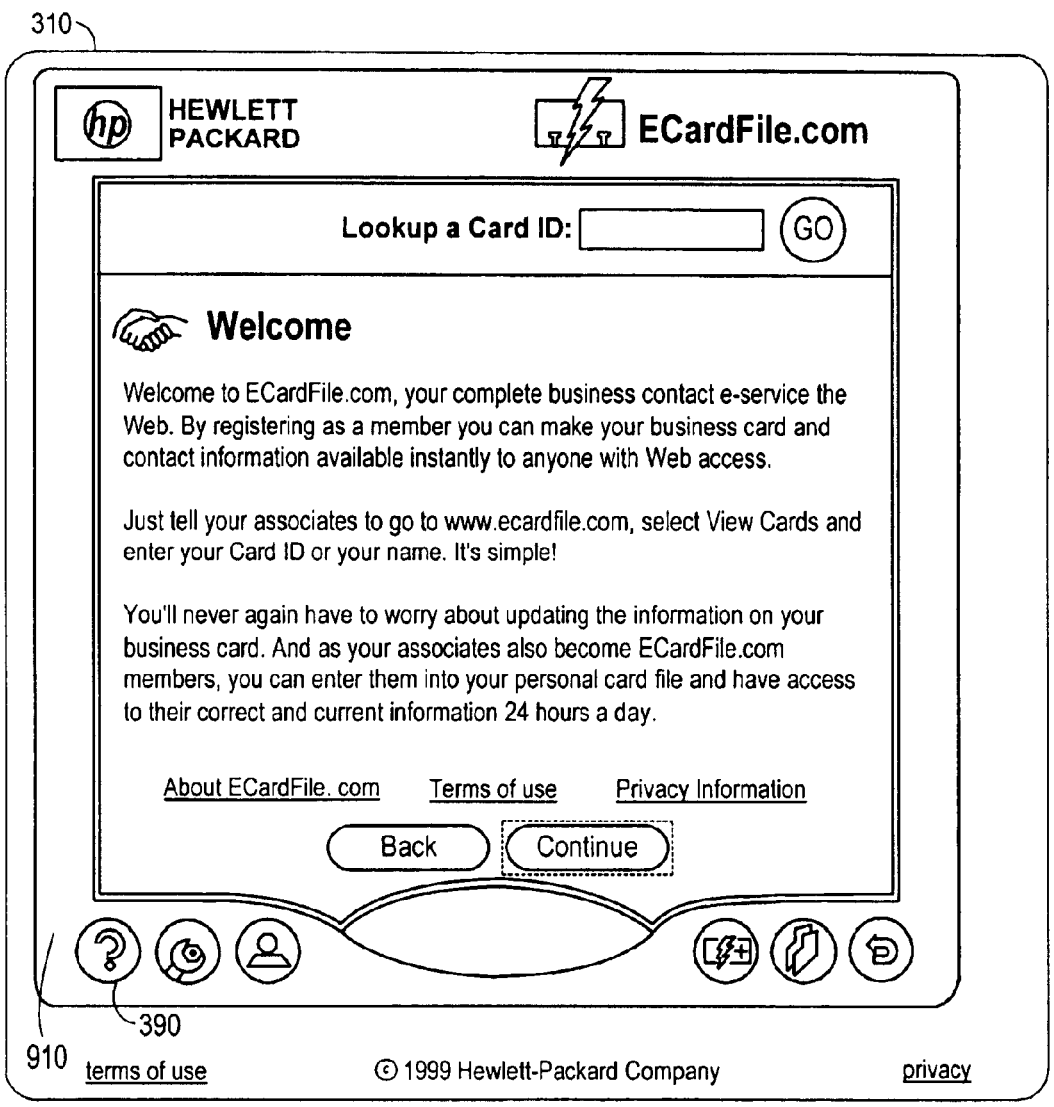
FIG. 9 is a screen shot of the Welcome display, according to one embodiment of the present invention.

If the user accepts the terms of use, and email message is automatically dispatched 550 by the EBC system to the new Member's designated authorizing email address (field 750 in FIG. 7B). A welcome screen 910 (FIG. 9) is then displayed to the new Member, step 560, in window 310.

Meanwhile, the user (now a Member) receives an authorization email message by conventional means. In one embodiment of the present invention, such an email message is as shown in Table 1 below. This email authorization method provides a measure of additional security by ensuring that each Member is associated with a valid email address. The email address is also used to verify a user identity in case of a lost password: on the user's request, the password will be sent to the authorized email address only.

Figure 10:
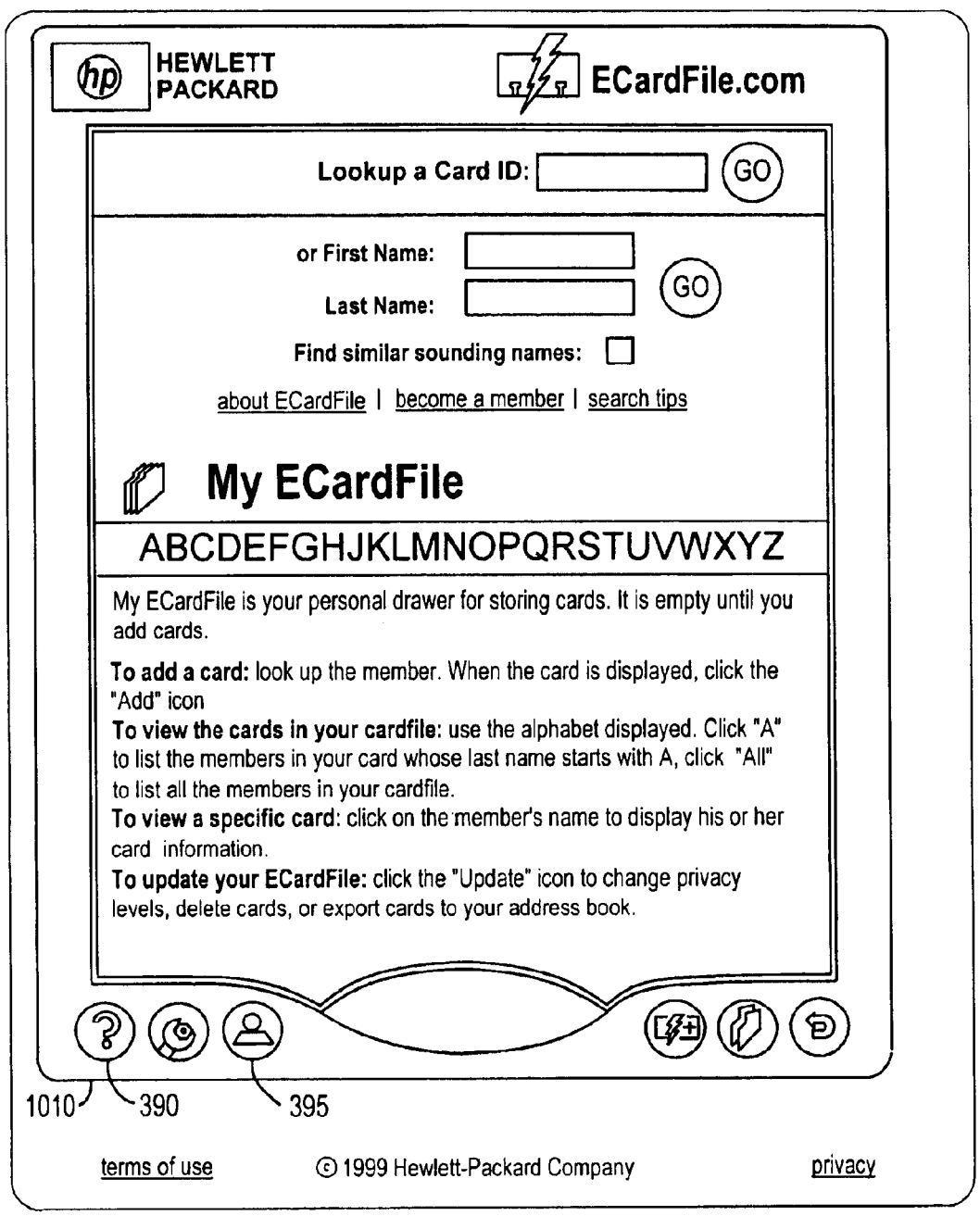
FIG. 10 is a screen shot of the My ecardfile display, according to one embodiment of the present invention.

When the user selects the embedded hyperlink (in this example, the string beginning http://ecardfile.com . . . ) in step 570, the EBC system directs the Member (in step 580) to home page 1010 in window 310 (FIG. 10). In some embodiments (not shown), home page 1010 is personalized with Member data, such as the Member's name.

TABLE 1

Figure 11:
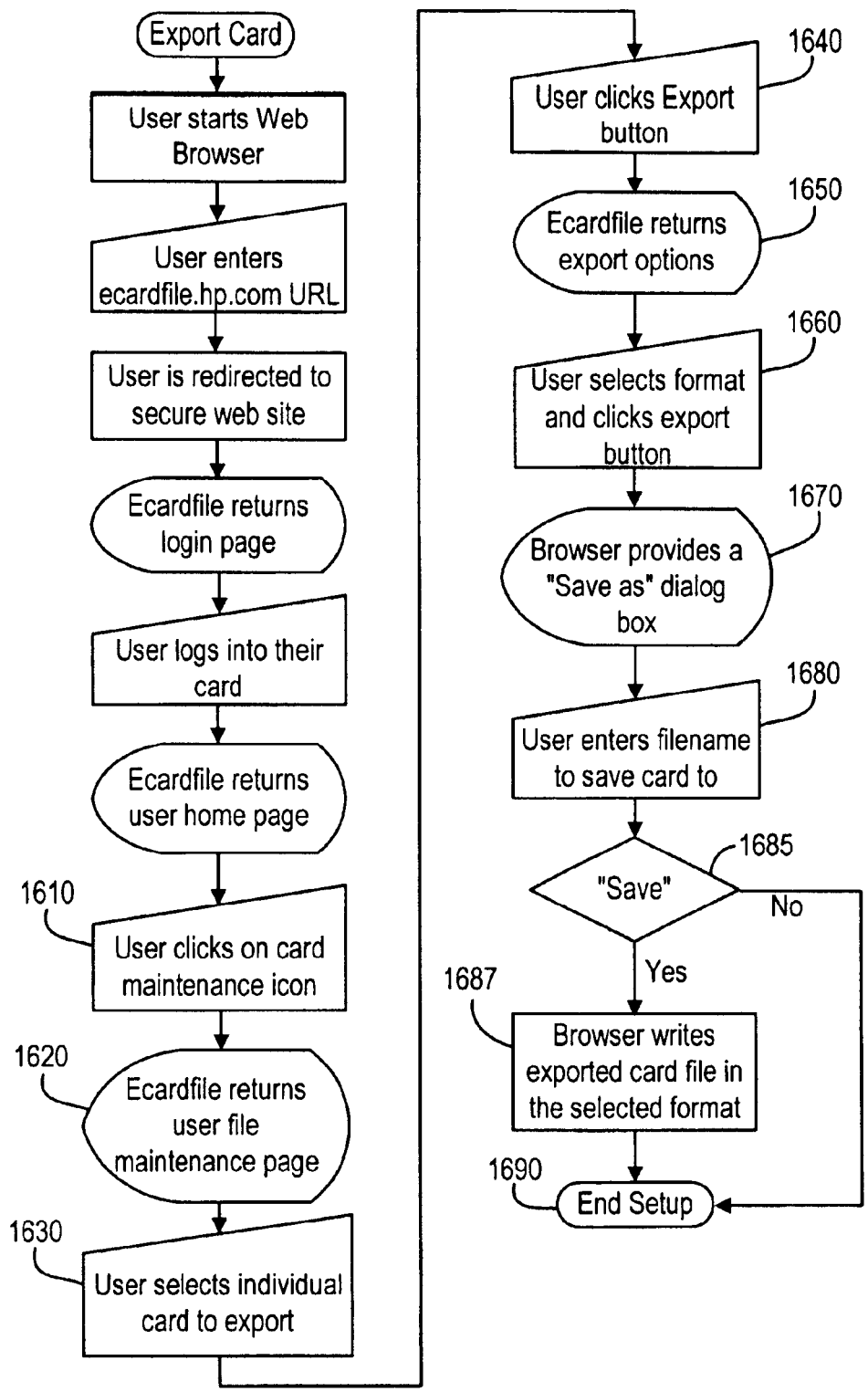
FIG. 11 is a flowchart of the Export process, according to one embodiment of the present invention.
Figure 12:
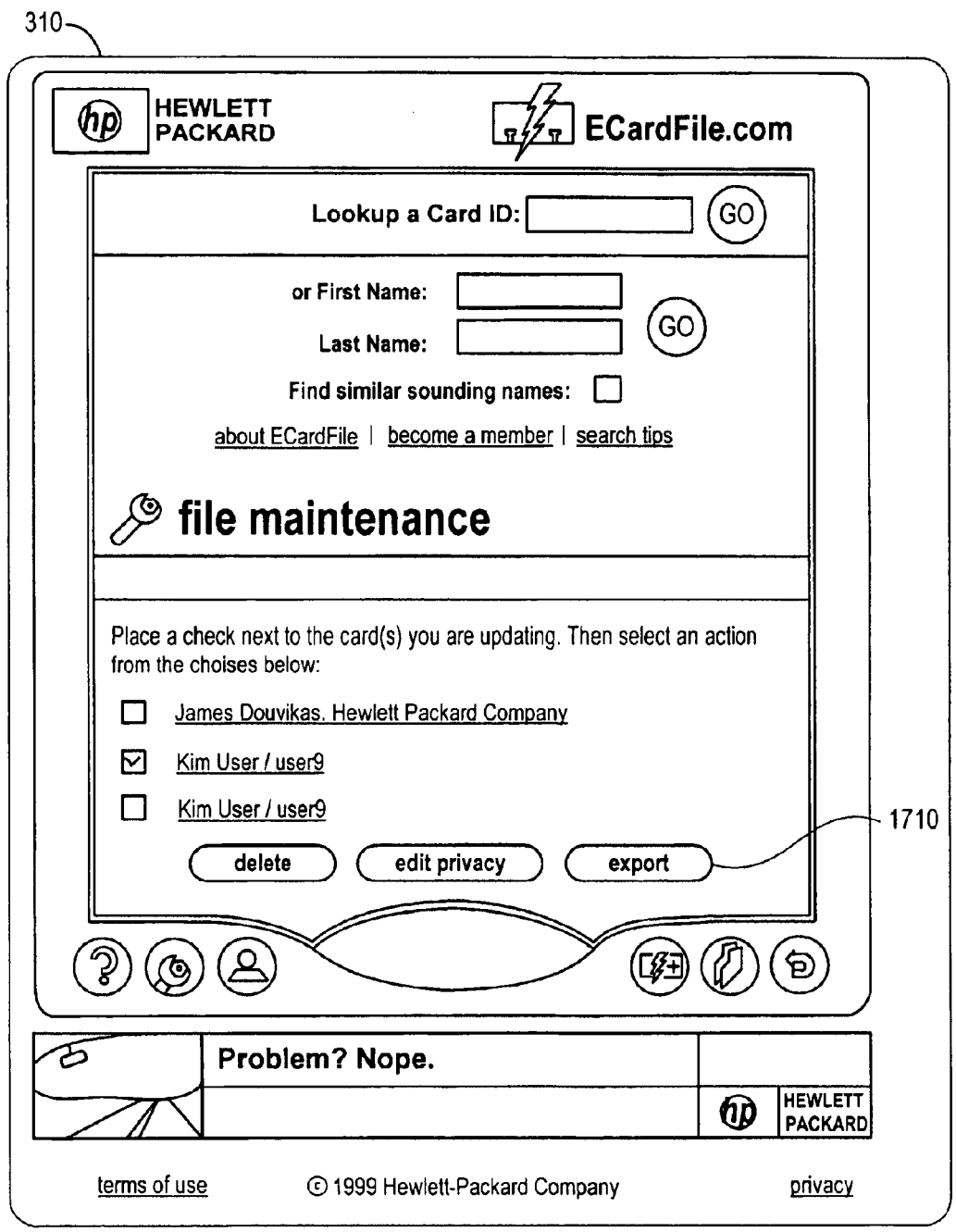
FIG. 12 is a screen shot of the File Maintenance display, according to one embodiment of the present invention.

Welcome! You have been added as a new Member of ecardfile.com. To activate your password, please click on the Web address below:
http://ecardfile.com/search?op=Confirm&eCardId=terry&createId=0Av4Jj6nWZwA4
You can also type the above Web address into your Web browser. Once you have connected to the ecardfile.com site through the above address, your password activation is complete, and you can begin to enjoy the ease and convenience of having your business contact information on the Web.
If you do not connect to ecardfile.com through the above address within two weeks, your card will be deactivated.
We look forward to having you as an ecardfile.com Member!
webmaster@ecardfile.com Export Process FIG. 11 shows the process whereby a user is able to export card data to a file. As above, the user must first login to ecardfile.com. At step 1610, the user selects file maintenance button 394. A user file maintenance screen (FIG. 12) is then displayed, step 1620. The user selects a card to export, step 1630, from the list of cards added by the user to his/her private list. These cards represent other users to whom the user has granted extra privileges. Non-member users do not have export privileges. Of course, only the information to which the user has been granted access is exported.

Figure 13:
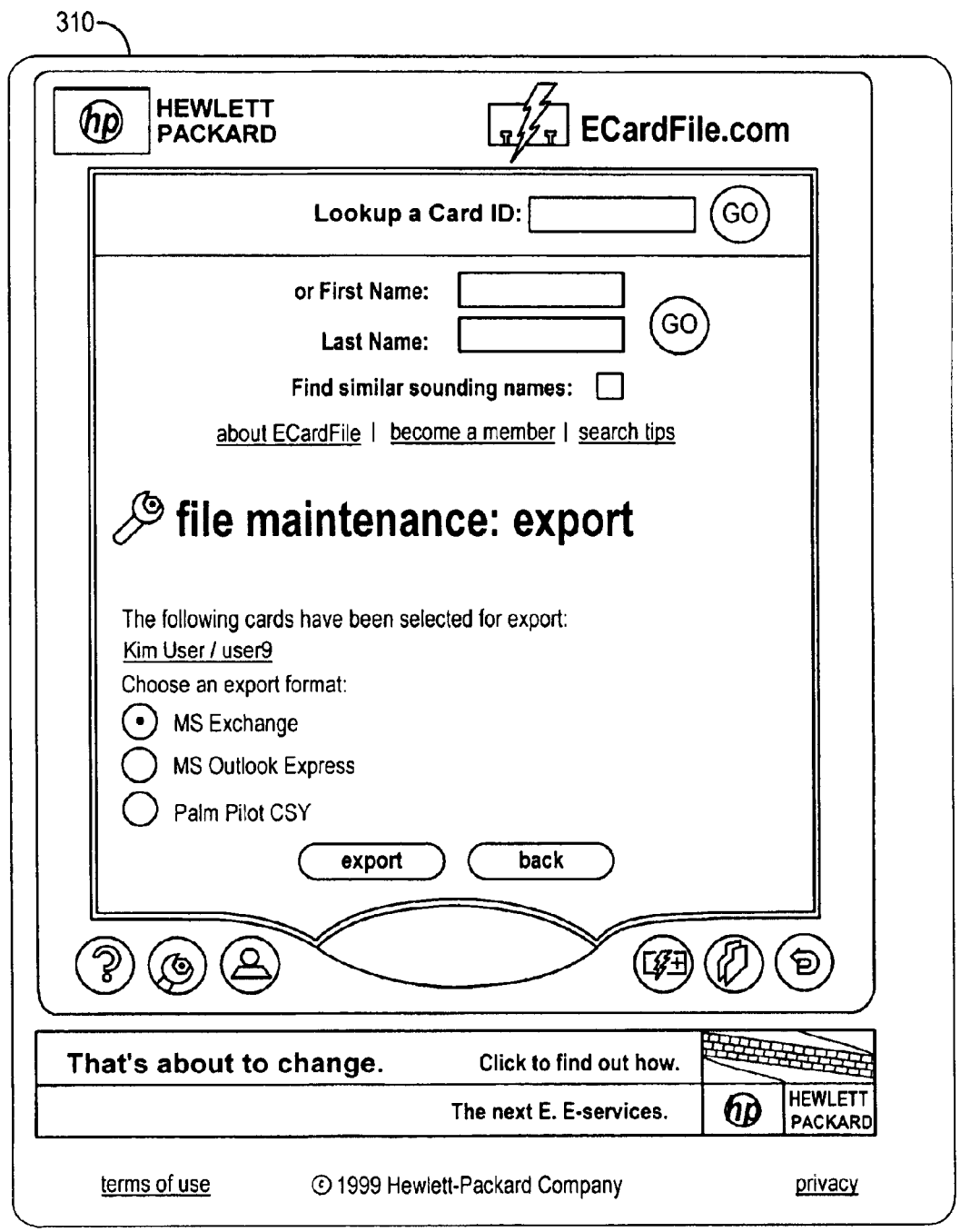
FIG. 13 is a screen shot of the Export display, according to one embodiment of the present invention.

The user next selects the export button 1710 (FIG. 12) in step 1640, which brings up an export options screen, shown in FIG. 13. The user selects the desired output format, step 1660, and is presented with a conventional "Save As" dialog, step 1670. The user enters a name of the file into which the card export will be saved, step 1680 and selects the Save button, step 1685. If Save is selected, the data will be saved by conventional means in step 1687. If not, as when the user selects "Cancel" instead, the process drops to the end state, step 1690, and returns to waiting for user input.

The exported card is formatted into a pre-defined data file structure readable by one or more conventional and commercially-available contact management programs. In some embodiments, custom export file formats may also be defined by the user to provide even wider connectivity and cross-platform utility.

"Where Am I?" Contact Location Tracking

Figure 14:
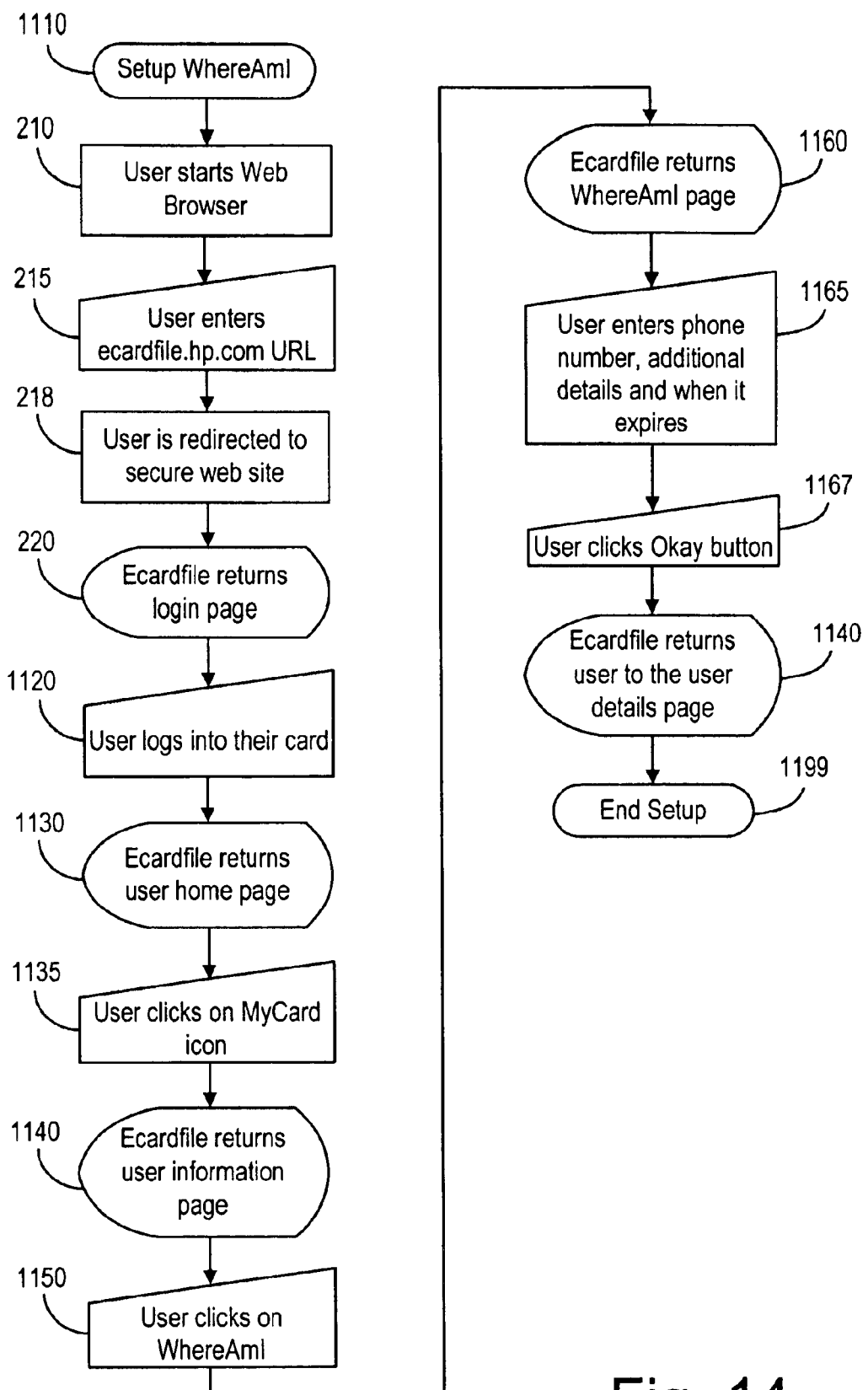
FIG. 14 is a flowchart of the "Where Am I?" process, according to one embodiment of the present invention.

The process of setting up a temporary location pointer for a specific Cardholder/Member begins in step 1110 of FIG. 14. As before, the Member sets his or her browser to the appropriate EBC system URL and connects to the system, steps 210, 215, 218, and 220. The Member then logs in, step 1120, and is displayed home page 1010 (FIG. 10) in step 1130.

The Member then selects an icon or button denoting the function "Edit My Card." In one embodiment of the present invention, this function is iconified in button 395. In response, the EBC system displays (step 1140) a user information screen (not shown) in window 310. The Member there selects a button denoting the function "Where Am I?" in step 1150.

Figure 15:
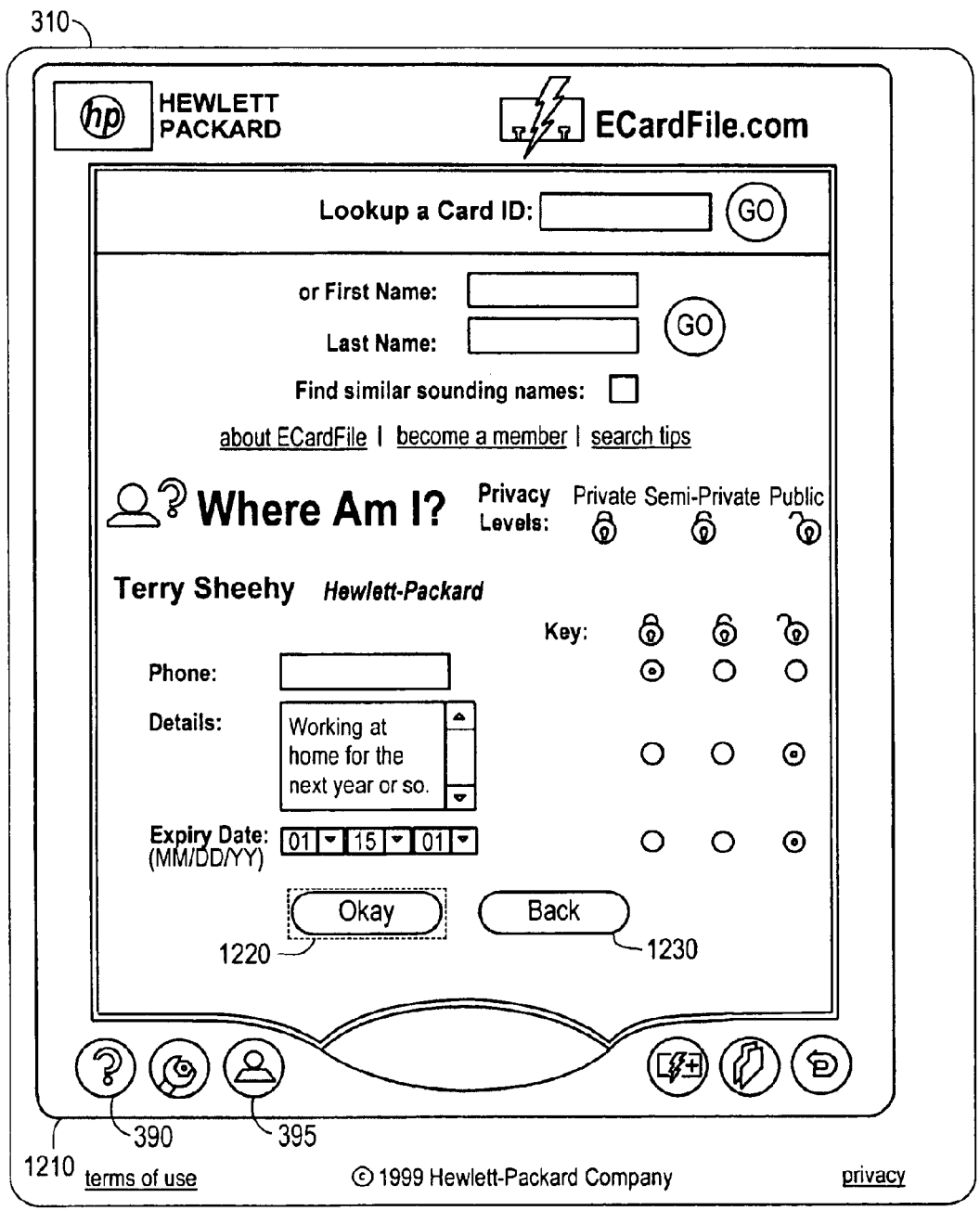
FIG. 15 is a screen shot of the "Where Am I?" display, according to one embodiment of the present invention.

At this point (step 1160), the EBC system displays "Where Am I?" screen 1210 (FIG. 15) in window 310 thereby prompting the Member for a phone number and additional details of the Member's location, step 1165. This information also includes an expiration date, i.e., a date beyond which the "Where Am I?" data is no longer valid.

To exit the "Where Am I?" information dialog, the Member clicks Okay button 1220 (step 1167), to save the "Where Am I?" data, or the Back button 1230 to cancel "Where Am I?" data input. The process returns to a display of the user information screen, step 1140, and stops, step 1199.

Signature Hyperlinking

Figure 16:
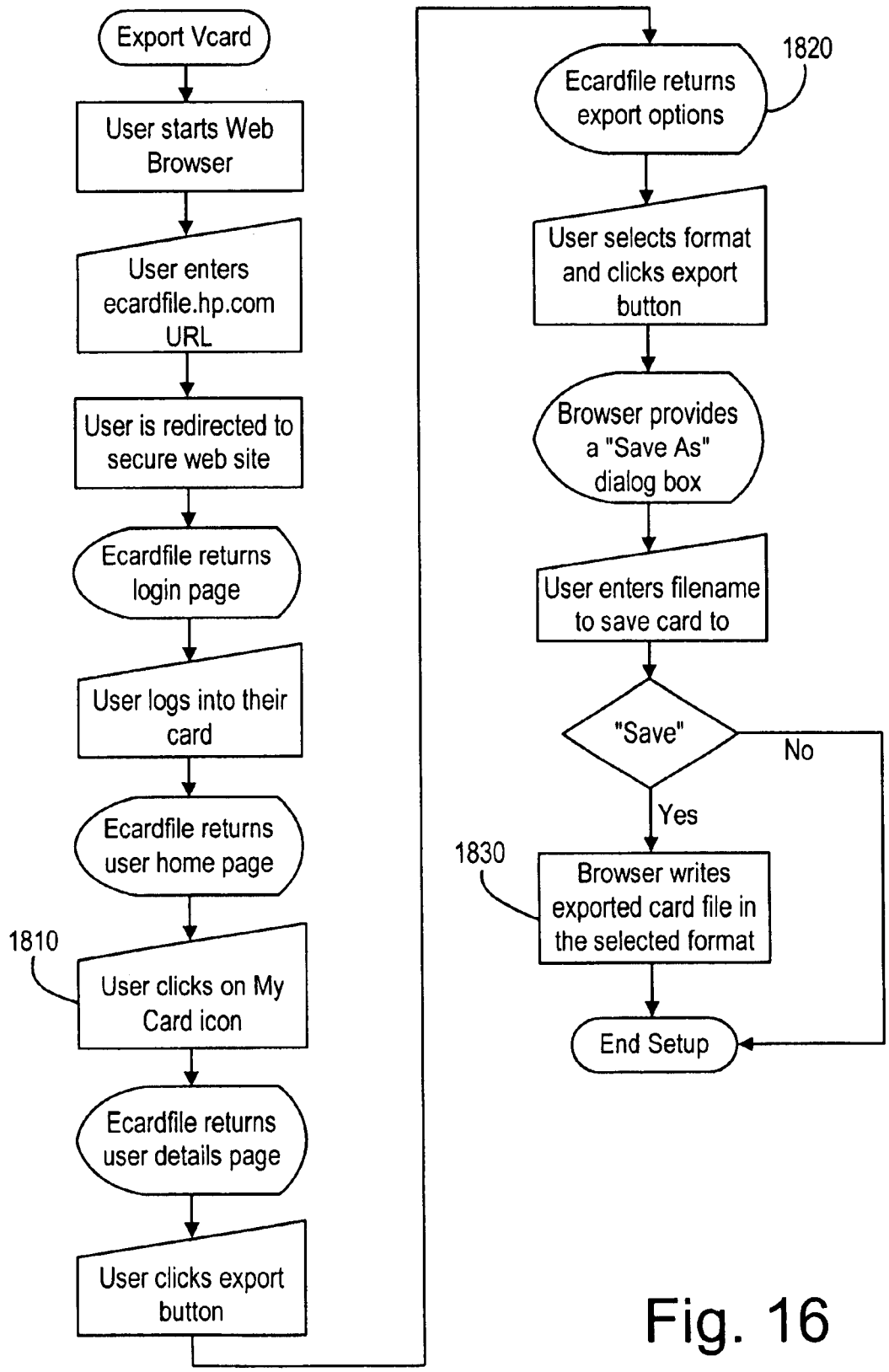
FIG. 16 is a flowchart of the signature hyperlink export process, according to one embodiment of the present invention.
Figure 17:
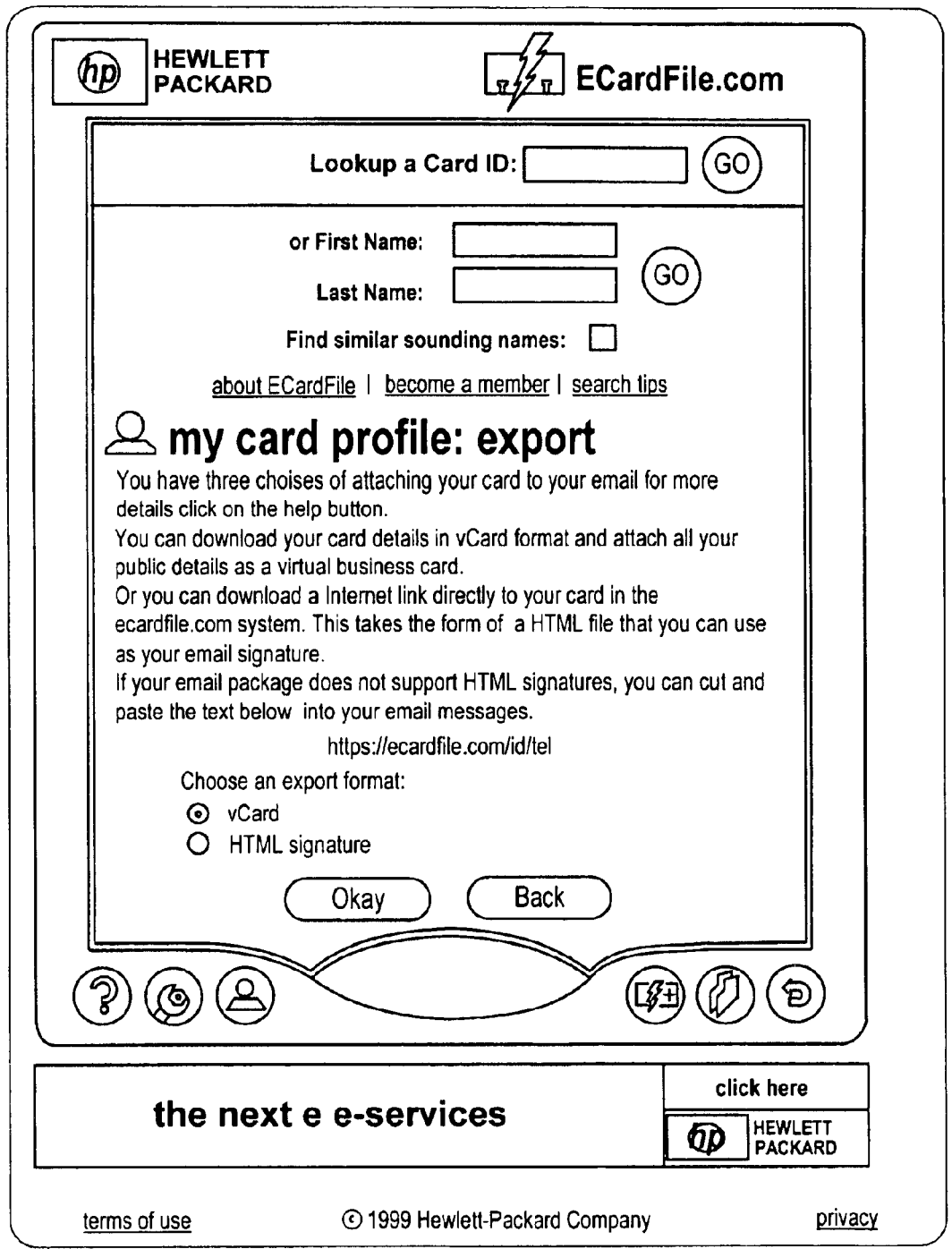
FIG. 17 is a screen shot signature hyperlink export display, according to one embodiment of the present invention.

The process of exporting a signature hyperlink, shown in FIG. 16, is almost the same as that of exporting a card, except that the user selects the My Card button 395 rather than the file maintenance button 394. The options screen, shown in FIG. 17, is presented at step 1820. The output of the process, step 1830, is a file containing either a hyperlink or a conventional vCard file, as selected from the options display of FIG. 17.

Either the signature hyperlink or the vCard (which can also contain a hyperlink) can then be used by conventional email programs. Electronic mail sent by the cardholder is automatically formatted to contain a signature hypertext link, according to the well-known hypertext markup language (HTML) standard or any of its common variants, directing recipients of the email to the electronic business card access and organization system. This hyperlink enables the recipient of the email to rapidly access the EBC system to locate the cardholder and/or obtain additional information. In effect, receipt of an email containing the hyperlink enables the recipient to easily become a user. In some embodiments, the signature hyperlink is part of the vCard feature known and implemented in common email programs such as Microsoft Outlook and Netscape Communicator®. In an alternate embodiment, the signature hyperlink is implemented using the well-known email signature block feature.

ecardfile Help Screens

The following topics are the subject of individual help screens, available to any EBC system user or Member by pushing (in some embodiments of the present invention) the Question Mark ("?") button 390, shown in, e.g., FIG. 3A. The contents of these help screens are reproduced below as an aid to understanding the EBC system.

Become a Member
Set up your card
Set up "Where Am I?"
Add others' cards to your ecardfile
Exchange cards with others
Set/change privacy levels
Export cards to your address book
Set up your email signature
Contact ecardfile.com support
Become a Member As an ecardfile Member, you set up your own Card Profile and establish your own unique Card ID and Password. Then, whenever you log in, you are located at your personal ecardfile and can view cards from other Members and add them into your ecardfile.

Let's walk through the process of becoming a Member.
1. From the Member login screen, click the Become a Member button.
2. Fill in your Card Profile: the profile contains all of your contact information and can be updated as needed. See the help menu topic "Set Up Your Card" for more information.

After your membership is confirmed, you can log in to ecardfile.com using your Card ID and password. After log in, you are brought to your personal ecardfile area. Here is where you can store other Member cards and perform functions such as adding, deleting, changing the privacy level access to your Card that you have given to other Members, and exporting a card to your address book.

It's a good idea to keep your "Where Am I?" information current. To access it, click on the My Card Profile icon and scroll to the bottom of the screen.

The more people you know who join ecardfile.com, the easier it is to use this convenient way to access business information. To help get the word out, please download your personal email signature or vCard (accessible from the export button at the bottom of your Card Profile) and attach it to all your emails. When people receive email from you, they can click on your signature link and go directly to your Card Profile in ecardfile.com. From there, they can also choose to become ecardfile Members, if they are not Members already.

Set Up Your Card

When filling in your Card Profile, please keep a few concepts in mind: When selecting your Card ID, use up to 40 alphanumeric characters. Because you will be giving out this ID to your business and personal contacts, make your ID simple and easy to remember, it's use is similar to that of your email username. Although ecardfile.com also enables you to be looked up through a first name/last name search, it will usually be much faster for people to look you up by your Card ID.

When selecting your password, use up to 10 alphanumeric characters. Make your password something easy for you to remember and hard for others to guess.

As you are entering information into your Card Profile, please keep in mind that ecardfile.com gives you three levels of privacy for each field:

Level 1—Public. Information at this level will be displayed to anyone who looks up your card. This could be anyone viewing cards from the World Wide Web, whether you know them or not.

Level 2—Semi-Private. Information at this level will displayed only to other ecardfile Members who are in your personal ecardfile and who have been designated to receive your semi-private information.

Level 3—Private. Information at this level will displayed only to other ecardfile Members who are in your personal ecardfile and who have been designated to receive your private information.

All field information is set to private when you first fill out a Card Profile. Be sure to select other privacy levels for fields that are either semi-private or public.

The Email Auth field is used only by ecardfile.com for verification purposes. It is never displayed on your Card. You must enter a current email address in the Email Auth field. Once you complete the Card Profile and click "OK," ecardfile sends an email to this address and waits for your reply before authorizing your membership and enabling you to log in. This authorization process has been designed to protect your privacy and identity.

Add Others' Cards to Your ecardfile

From your personal ecardfile screen, use the Look Up fields to view the card of the Member you want to add. When the card is displayed, press the Add icon.

If you would like to give this Member access to your semi-private or private ecardfile information, be sure to change the privacy level displayed next to the Member's name. See the help topic "Set/change privacy levels" for more information.

Exchange Cards with Others

In order to protect your privacy, ecardfile.com offers several ways you can exchange cards with others.

Anyone, whether they know you or not, can look you up by name and see the information designated as "public" in your Card Profile. Note: for this reason, you may decide not to have your email addresses be part of your public information.

Casual or new acquaintances can look you up by name search or by Card ID and see the information designated as "public" in your Card Profile.

Members can look you up by name search or Card ID and see the public, semi-private or private information you have specifically designated for them.

For example, let's say a new person, Hans, has joined your project team; he works out of your company's Munich office, and you are in Los Angeles. Hans is not yet a Member of ecardfile.com.

1. At the initial team conference call, you give Hans your Card ID and tell him that's where all your contact information is.
2. Hans accesses ecardfile.com and becomes a Member. He looks up your Card and adds it to his personal ecardfile. He wants you to have his semi-private information so he marks your card with the semi-private access key.
3. You look up Hans's card and add it to your personal ecardfile. You then mark Hans's card with the semi-private access key so that he can see more detailed information about you than what appears on your public card.
4. Over the next 6 months, Hans changes office locations and gets a new phone number; your fax number changes, and the Post Office gives your part of town a new zip code. Thanks to ecardfile.com, your contact information is always current.

Set Up "Where Am I?"

From your Card Profile, scroll to the bottom of the screen and click on "Where Am I?" You'll have the option to input a current phone number, details about your whereabouts, and an expiration date. Note that you can specify different privacy levels for the phone number, details and expiration fields, so you might want your phone number to be public, while the details of where you are remain private. To see another Member's "Where Am I?" information, select her card from your personal ecardfile or look up her card. When the card is displayed, scroll to the bottom of the screen and click on "Where Am I?".

The expiration date uses the date at the ecardfile server's location, US Pacific Standard Time (PST). The expiration date is customizable to the ecardfile Member's own location.

Set up Your Email Signature

Use this function to download a signature file or a vCard from ecardfile.com to your email system. Access it by going to your Card Profile, scrolling to the bottom of the screen, and clicking on Export. Then follow the instructions on the screen to export to your particular email system.

A signature file has an HTML link to your Card; when downloaded, the signature file will embed the link into all of your email messages. When someone reads your message and wants to view your contact information, he just clicks on the HTML link and is immediately connected to your Card and your up-to-the-minute contact information.

A vCard is a file that holds your contact information in a standard format. Some email packages such as Microsoft Outlook and Netscape Communicator recognize this format and can treat it in a special way. Because it is not a live link, it may display old or inaccurate information, particularly if someone is reading an old email message from you.

If your email package, or more importantly the message recipient's email package, does not support HTML tags or vCards, you may cut and paste the HTML link displayed and attach it to your messages. The recipient just clicks or cut and pastes the HTML link into a browser and is immediately connected to your Card and your up-to-the-minute contact information.

Export Cards to Your Address Book

Use this function to download cards from your personal ecardfile to your email address book.

1. Go to your personal ecardfile.
2. Select the card for export by placing a check mark next to it.
3. Click on the maintenance button.
4. Select export.
5. Select the format of your address book.
6. Follow the online instructions to export the card information.

Contact ecardfile.com Support Hyperlink

Here, an email window automatically pops up if this link is selected, and ecardfile.com's technical support address is automatically inserted into the "To" field.

Get Help on a Specific Screen, Field or Icon

To get help on a specific screen or field, place the mouse arrow on the gray bar of the screen and press the "Help" key on the keyboard.

To get help on a specific icon, pass the mouse over the icon, and the icon title will display.

One of ordinary skill in the art will appreciate that many other methods of activating context sensitive help are known in the art; the present disclosure is intended to encompass all such well-known methods and is not limited to any single form.

Set/Change Privacy Levels ecardfile.com gives you two ways to control who sees what information about you: You can designate each field in your Card Profile with a specific privacy level that governs private, semi-private or public viewing of that field. Alternatively, you can specify which Members have access to which level of privacy about you. If a particular Member has access to your semi-private information, he or she will see all of the fields marked public or semi-private when viewing your card.

Designate Your Card Profile Privacy:

To change privacy levels on a field in your Card Profile (for example, to make your business email address, which had been public, semi-private) click on the My Card Profile icon and then click the appropriate new privacy button next to the email address field. A public field has the open padlock icon selected. A semi-private field has the partly-open padlock icon selected. A private field as the closed padlock icon selected.

Specify Member Privacy:

Let's say you want to give your new manager access to your private information.

1. From your personal ecardfile, look up your manager's card and add it to your file.
2. Select the card for maintenance by placing a check mark next to it.
3. Click on the Maintenance button.
4. Select Edit Privacy.
5. Select the new privacy level you want your new manager to have about you.
6. Select Update to save the new privacy level.

Now, whenever your new manager accesses your Card, she will see all information you have designated as public, semi-private and private.

Software Implementation

Figure 18:
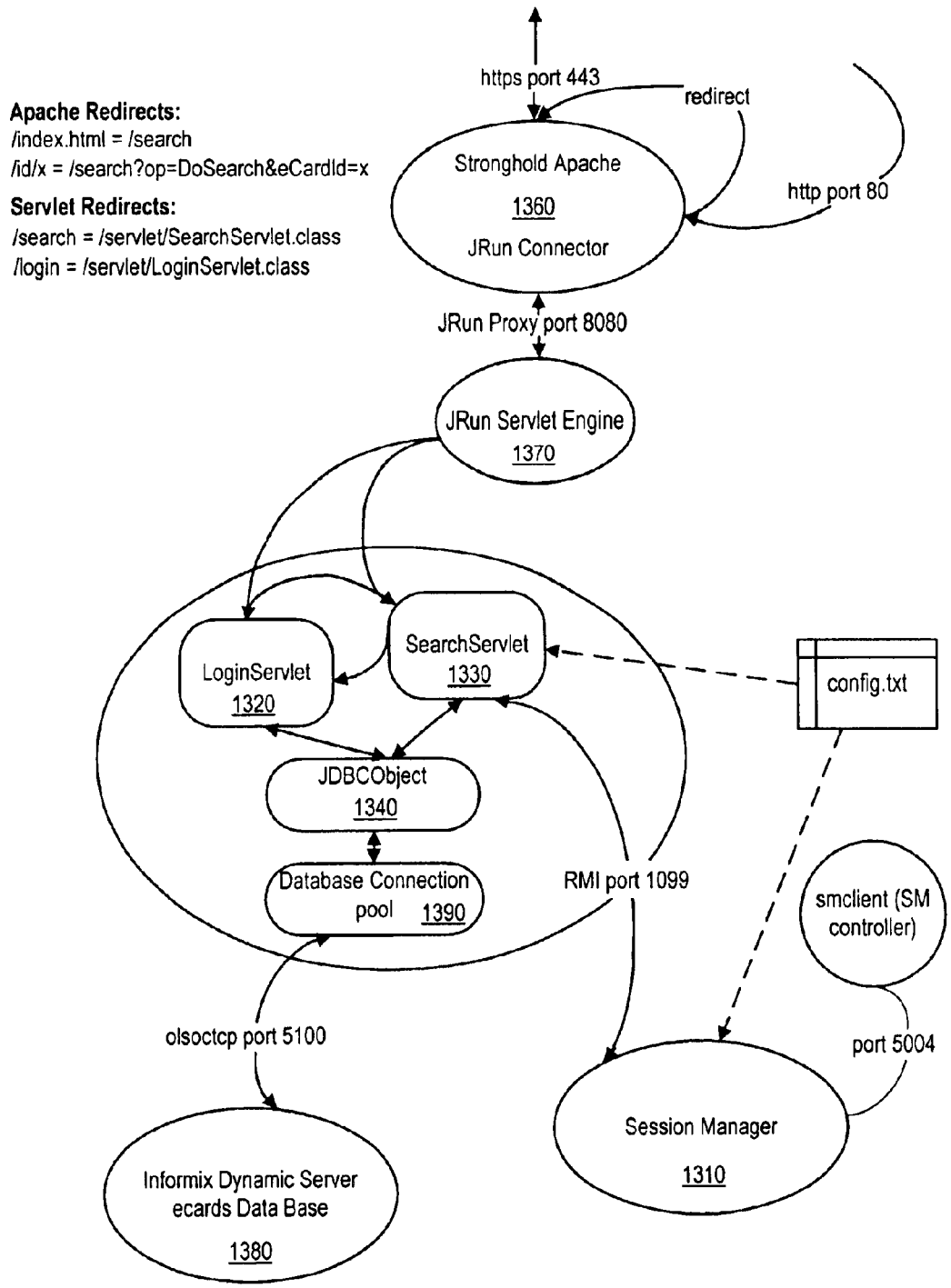
FIG. 18 is a function block diagram of the Boomerang software application, according to one embodiment of the present invention.

In one embodiment of the present invention, the controlling software application providing some of the EBC system functionality is called Boomerang. The Boomerang application has five major components, shown schematically in FIG. 18:

1. Session Manager daemon 1310, which maintains state information;
2. Login Servlet 1320, which handles user/Member authentication;
3. Search Servlet 1330, which handles most of the user/Member interface functionality;
4. JDBC Objects/Classes 1340, which implement the database functionality; and
5. HTML Template Engine, which handles conventional dynamic HTML processing. This component is typically implemented in Java and reads HTML tagged files.

Boomerang is designed to scale and perform well under extreme loads. It is designed to operate on multiple processors simultaneously, i.e., with multiple instances of objects and methods. Multiple Web servers and Java virtual machines may be used as server loading and traffic demands.

In one embodiment of the present invention, the Boomerang application, Web server 1360 (in one embodiment of the present invention, Stronghold Apache), JRun Servlet Engine 1370, and a Remote Memory Invocation (RMI) registry will run on each of the two Web server machines 110A and 110B (FIG. 1). The JRun Servlet Engine 1370, and RMI registry are common Java objects; the RMI API allows a servlet to invoke the methods of a Java object executing on another machine. The Session Manager 1310, another RMI registry, and the Informix database software 1380 will run on one of the databases servers 110C or 110D, the other database server acting as a warm fail-ver device.

Software Components

In the following discussion, the terms "Member" and "user" are used interchangeably to refer to a person who has established a login identify in the EBC system. Strictly speaking, however, a Member is a person who has completed the New Member process and properly replied to the authorization email; user is a person who has not.

Session Manager 1310

When the system is first accessed, a session will be created. This session will be identified by a unique session ID. This ID will be used for the following tasks.

Once a user has successfully logged in, the session ID will make a record of this fact so that when a user returns to a page that requires user authentication or identification, the user will not be re-prompted to login. The session ID will be passed from Web page to page as either a hidden field in a form or by rewriting the URL, both well-known techniques in the art. Alternatively, the user may be given the option of saving authentication information in a local file, known in the art as a cookie. The system will check for this cookie prior to displaying the login page.

The session ID will expire if it has not been accessed in a time configured by the EBC system administrator.

Login Servlet 1320

This servlet is activated when a function requiring user authentication is called and the user has not yet logged in. The login screen is shown and user name and password input received. The input name and password are matched against a users table. If the user name is found and the proper password supplied, the request (and session ID, if present) is passed to the Search Servlet.

Search Servlet 1330

The Search Servlet requests a session ID if one was not passed to it, or validates the ID if one was passed. If the requested operation requires user authentication and the user has not already logged in, the Login Servlet is called. All URL and form parameters are passed to the application logic of the servlet for processing.

After processing the URL and form parameters, a HTML document (e.g., a results screen) is returned to the requester, typically the browser window.

JDBC Objects/Classes 1340

These consist of generic JDBC classes that execute queries and return results in a Java hash table indexed by column name. To make more efficient use of database resources, all structured query language (SQL) statements are prepared at servlet initialization.

Also at servlet initialization, database connection pool 1390 creates a number of connections to the database, the precise number of which is configurable by the EBC system administrator. These connections are utilized by each servlet thread on an as-needed basis. Additional connections are created as demand requires; inactive connections are periodically recycled.

HTML Template Engine 1

All pages displayed by the Boomerang application, including the help and information screens, are dynamically generated. The base HTML code and image links for these pages are stored as template files which are preloaded on servlet initialization. These files are parsed and custom tags replaced with data extracted from the database (or calculated) before sending the page to the requestor and display to the user.

Administration Programs

In addition to the Boomerang application, the EBC system also includes a set of shell and SQL scripts that operate on a periodic basis (i.e., are activated by cron) to perform housekeeping and maintenance tasks. In particular, the following program functions are required.

a) Purge inactive users who have not activated themselves via the login email after a defined period of time, for example one month b) Expire "Where Am I?" temporary contact information c) Lock and unlock IP addresses (to prevent access by IP addresses that appear to be attempting to access the service for illicit purposes)

d) Rollover logs and reports

One of ordinary skill in the art will recognize that these functions may be implemented in a single program or script or in a set of programs and/or scripts. Accordingly, the present invention is not limited by the method of implementation of these functions.

Database Schema

Figure 19A:
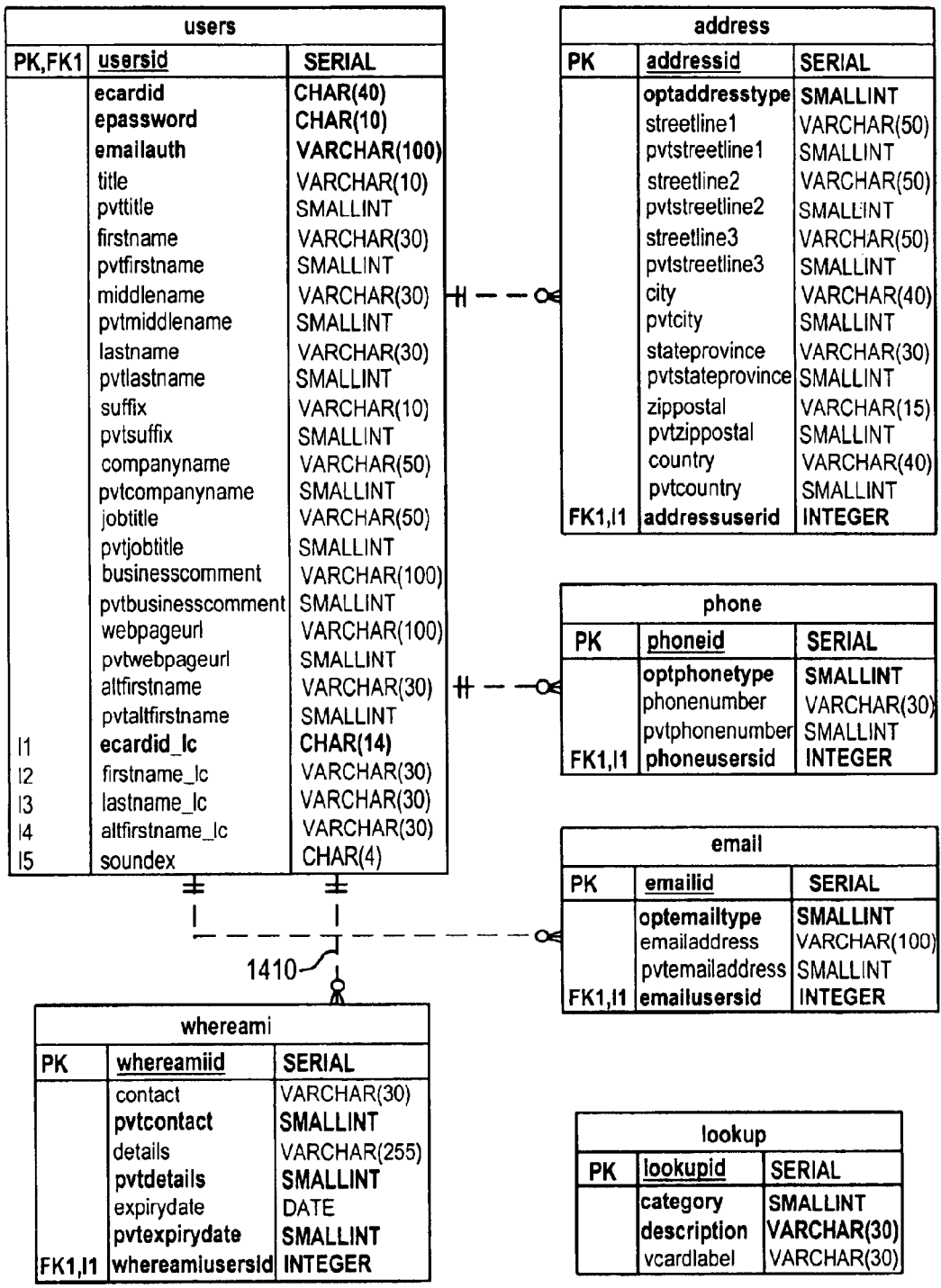
FIG. 19A is a schematic map of some of the database relationships, according to one embodiment of the present invention.
Figure 19B:
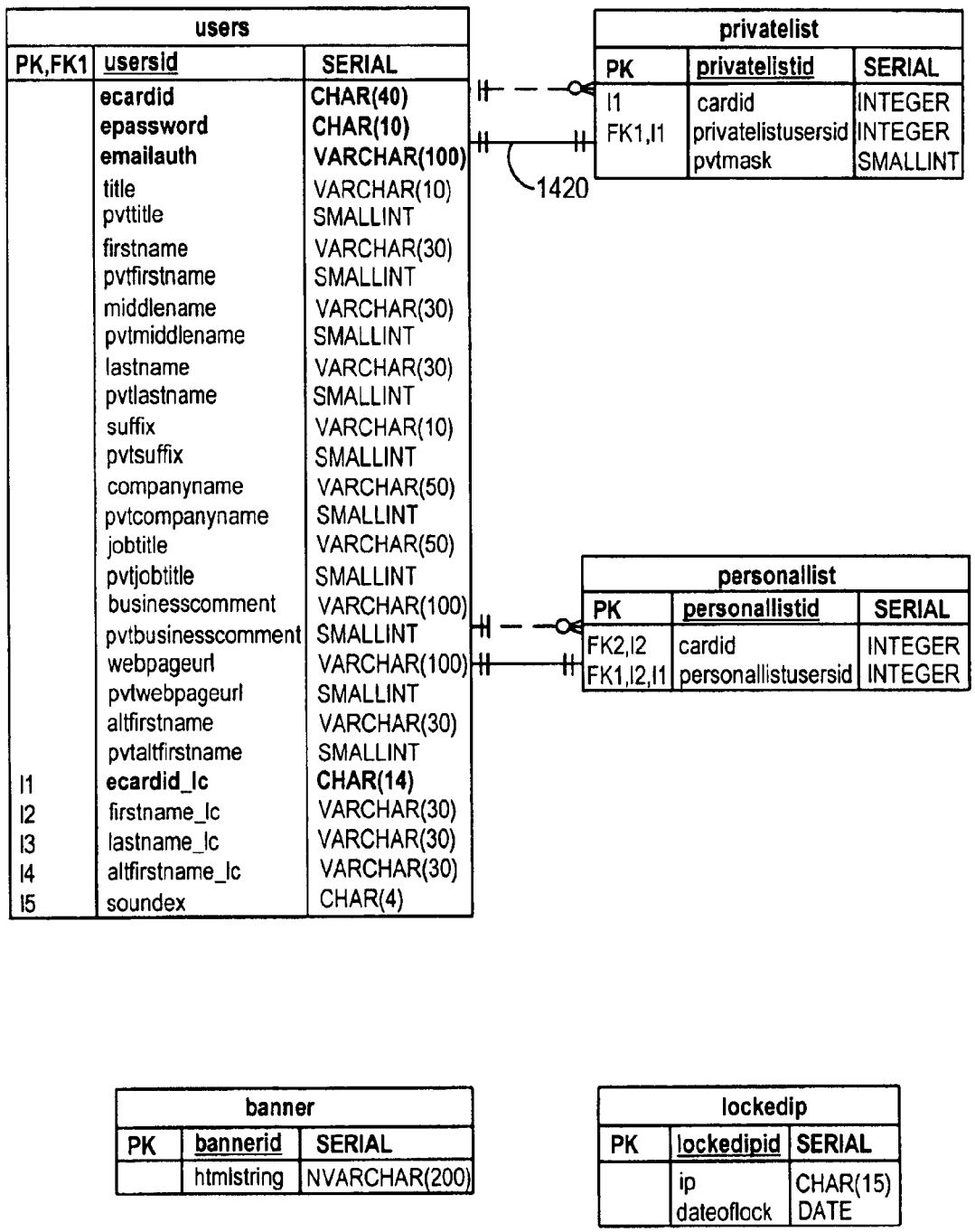
FIG. 19B is a schematic map of some of the database relationships, according to one embodiment of the present invention.
Figure 19C:
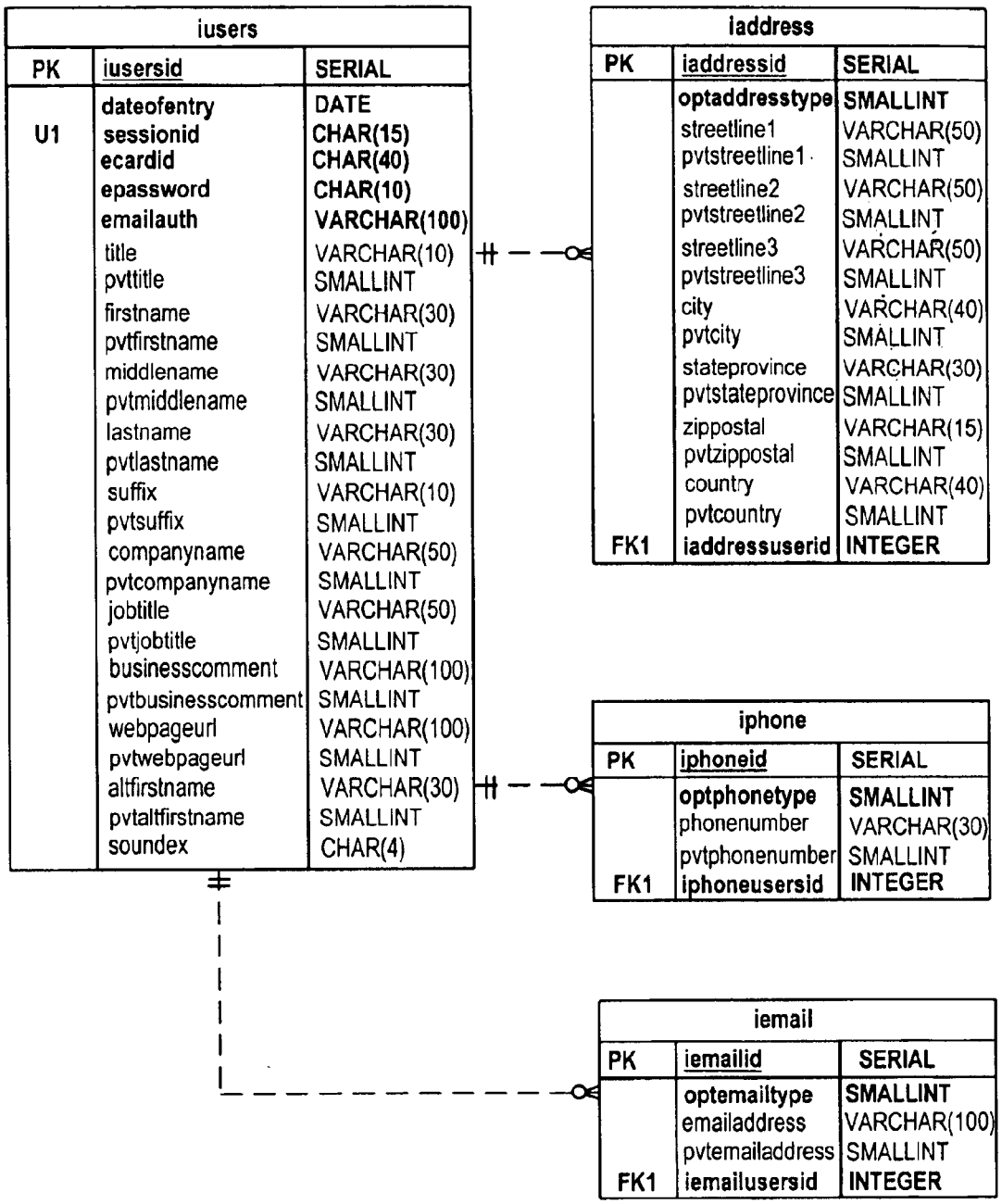
FIG. 19C is a schematic map of some of the database relationships, according to one embodiment of the present invention.

FIGS. 19A, 19B, and 19C illustrate the database structure and one-to-many/one-to-one relationships between records and fields in one embodiment of the present invention. In particular, relationship symbol 1410 denotes a one-to-many correspondence, the "one" side represented by the "=" sign end. See FIG. 19A for an example. Relationship symbol 1420 (see FIG. 19B) denotes a one-to-one mapping, the "one" side again represented by the "=" sign end.

The notations PK, FK1, and I1–I5 represent SQL field labels. SERIAL, in particular, is a well-known data type.

Although a particular database schema and naming convention for records and fields is described, those skilled in the art will realize that schema other than that described can also be used. Accordingly, the invention is not limited to any particular type of database schema.

Alternate Embodiments

In an alternate embodiment, the EBC system may be installed behind a conventional network "firewall" security device and thus made accessible only to browsers connected to and authorized to use the intranet defined by and behind the firewall.

Access to and delivery of contact information in the EBC system is also not limited to a Web browser interface as commonly known today. Some embodiments of the present invention provide multi-mode access interfaces, including but not limited to interfaces using voice-controlled and conventional wireless PDA and/or cell phones, two-way pagers, and wireless air protocol (WAP)-enabled devices.

Further embodiments of the present invention provide data delivery interface embodiments using, for example, the common alphanumeric pager, wireless markup language (WML), or voice delivery (e.g., audio playback) systems commonly used in the art.

The EBC system also provides an advanced search function that allows users to search for records matching specific, desired characteristics. The search can be made based on one or more of a variety of database parameters, including but not limited to field value (e.g., NAME=Sheehy), date of entry, or a Boolean combination of search terms.

In an alternate embodiment of the "Where Am I?" location tracking feature, the cardholder can rapidly designate one of a pre-defined set of contact locations described by meatspace address, phone number, FAX number, and/or email address.

The order in which the steps of the processes depicted above are performed is purely illustrative in nature. In fact, the steps in each process flow can be performed in any order or in parallel, unless otherwise indicated by the present disclosure.

The method of the present invention may be performed in either hardware, software, or any combination thereof, as those terms are currently known in the art. In particular, the present method may be carried out by software, firmware, or microcode operating on a computer or computers of any type. Additionally, software embodying the present invention may comprise computer instructions in any form (e.g., source code, object code, or interpreted code) stored in any computer-readable medium (e.g., ROM, RAM, magnetic media, punched tape or card, compact disc (CD) in any form, DVD). Furthermore, such software may also be in the form of a computer data signal embodied in a carrier wave, such as that found within the well-known Web pages transferred among computers connected to the Internet. Accordingly, the present invention is not limited to any particular platform, unless specifically stated otherwise in the present disclosure.

While particular embodiments of the present invention have been shown and described, it will be apparent to those skilled in the art that changes and modifications may be made without departing from this invention in its broader aspect and, therefore, the appended claims are to encompass within their scope all such changes and modifications as fall within the true spirit of this invention.

Trademark Notices

Cisco Systems and PIX are registered trademarks and Catalyst, Local Director are trademarks of Cisco Systems, Inc., San Jose Calif.

Hewlett-Packard and HP-UX are registered trademarks and MC-Service Guard and ecardfile are trademarks of the Hewlett-Packard Company, Palo Alto, Calif.

Informix is a registered trademark and Informix Dynamic Server is a trademark of Informix Software, Menlo Park, Calif.

Java is a trademark of Sun Microsystems, Inc., Palo Alto, Calif.

JRun is a trademark of Allure Corp., Cambridge, Mass.

Microsoft is a registered trademark of Microsoft Corp., Redmond, Wash.

Netscape, Netscape Navigator, and Netscape Communicator are registered trademarks of Netscape Communications Corp., Mountain View, Calif.

Stronghold is a registered trademark of C2Net, Inc., Oakland, Calif.

We claim:

1. A computer-readable storage medium, comprising computer instructions for:
providing an electronic business card file Web site to a user;
allowing the creation of an electronic business card file by the user using said Web site, said creation comprising:
allowing the user to enter information into a plurality of fields in the electronic business card file;
storing said information; and
sending an authentication email to the user, wherein a reply to said authentication email is required to complete said creation;
allowing the user to search for one or more records;
allowing the user to view said records and to export electronic business card data from records in a private list of the user to a file readable by a contact management program, wherein another user associated with a record in the private list has extra privileges granted by the user;
if said creation is completed, allowing the setting of privacy levels by the user for each said field, said setting comprising selecting one of more than two privacy levels so that the user controls data shown in each said field to another user based upon the selected privacy level for each said field, wherein the user can set the privacy level to Private, Semi-Private, or Public for each particular field in the electronic business card file, wherein the user can set the privacy level to Private, Semi-Private, or Public by selecting a Private icon, Semi-Private icon, or Public icon, respectively, for a corresponding field in the electronic business card file;
allowing the user to indicate a location of the user prior to an expiration date; and
sending an electronic mail by the user to a recipient, wherein the electronic mail contains a signature hypertext link that permits the recipient to access the electronic business card file Web site in order to create a new electronic business card file for the recipient and to access information in a permitted field of the electronic business card file of the user;
wherein the electronic business card file Web site is implemented by use of two front-end web servers and a database server that is accessed by the two front-end web servers.

2. The computer-readable storage medium of claim 1, wherein said electronic business card file Web site is accessible from the Internet.

3. The computer-readable storage medium of claim 1, wherein said electronic business card file Web site is accessible from an intranet isolated from the Internet by a firewall security device.

4. The computer-readable storage medium of claim 1, wherein said electronic business card file Web site is accessible from a web browser.

5. The computer-readable storage medium of claim 1, wherein said electronic business card file Web site is accessible from a personal digital assistant.

6. The computer-readable storage medium of claim 1, wherein said electronic business card file Web site is accessible from a browser-enabled telephone.

7. The computer-readable storage medium of claim 1, wherein said electronic business card file Web site is accessible by spoken commands.

8. The computer-readable storage medium of claim 1, wherein a first format response scheme to the user comprises audio playback.

9. A computer data signal embodied in a carrier wave, comprising computer instructions for:
providing an electronic business card file Web site to a user;
allowing the creation of an electronic business card file by the user using said Web site, said creation comprising:
allowing the user to enter information into a plurality of fields in the electronic business card file;
storing said information; and
sending an authentication email to the user, wherein a reply to said authentication email is required to complete said creation;
allowing the user to search for one or more records;
allowing the user to view said records and to export electronic business card data from records in a private list of the user to a file readable by a contact management program, wherein another user associated with a record in the private list has extra privileges granted by the user;
if said creation is completed, allowing the setting of privacy levels by the user for each said field, said setting comprising selecting one of more than two privacy levels so that the user controls data shown in each said field to another user based upon the selected privacy level for each said field, wherein the user can set the privacy level to Private, Semi-Private, or Public for each particular field in the electronic business card file, wherein the user can set the privacy level to Private, Semi-Private, or Public by selecting a Private icon, Semi-Private icon, or Public icon, respectively, for a corresponding field in the electronic business card file;
allowing the user to indicate a location of the user prior to an expiration date; and
sending an electronic mail by the user to a recipient, wherein the electronic mail contains a signature hypertext link that permits the recipient to access the electronic business card file Web site in order to create a new electronic business card file for the recipient and to access information in a permitted field of the electronic business card file of the user;
wherein the electronic business card file Web site is implemented by use of two front-end web servers and a database server that is accessed by the two front-end web servers.

10. The computer data signal of claim 9, wherein said electronic business card file Web site is accessible from the Internet.

11. The computer data signal of claim 9, wherein said electronic business card file Web site is accessible from an intranet isolated from the Internet by a firewall security device.

12. The computer data signal of claim 9, wherein said electronic business card file Web site is accessible from a web browser.

13. The computer data signal of claim 9, wherein said electronic business card file Web site is accessible from a personal digital assistant.

14. The computer data signal of claim 9, wherein said electronic business card file Web site is accessible from a browser-enabled telephone.

15. The computer data signal of claim 9, wherein said electronic business card file Web site is accessible by spoken commands.

16. The computer data signal of claim 9, wherein a first format response scheme to the user comprises audio playback.

17. A method of providing access to a collection of electronic business cards, comprising the steps of:
  providing an electronic business card file Web site to a user;
  allowing the creation of an electronic business card file by the user using said Web site, said creation comprising:
    allowing the user to enter information into a plurality of fields in the electronic business card file;
    storing said information; and
    sending an authentication email to the user, wherein a reply to said authentication email is required to complete said creation;
  allowing the user to search for one or more records;
  allowing the user to view said records and to export electronic business card data from records in a private list of the user to a file readable by a contact management program, wherein another user associated with a record in the private list has extra privileges granted by the user;
  if said creation is completed, allowing the setting of privacy levels by the user for each said field, said setting comprising selecting one of more than two privacy levels so that the user controls data shown in each said field to another user based upon the selected privacy level for each said field, wherein the user can set the privacy level to Private, Semi-Private, or Public for each particular field in the electronic business card file;
  allowing the user to indicate a location of the user prior to an expiration date; and
  sending an electronic mail by the user to a recipient, wherein the electronic mail contains a signature hypertext link that permits the recipient to access the electronic business card file Web site in order to create a new electronic business card file for the recipient and to access information in a permitted field of the electronic business card file of the user;
  wherein the electronic business card file Web site is implemented by use of two front-end web servers and a database server that is accessed by the two front-end web servers.

18. The method of claim 17, wherein said electronic business card file Web site is accessible from the internet.

19. The method of claim 17, wherein said electronic business card file Web site is accessible from an intranet isolated from the Internet by a firewall security device.

20. The method of claim 17, wherein said electronic business card file Web site is accessible from a web browser.

21. The method of claim 17, wherein said electronic business card file Web site is accessible from a personal digital assistant.

22. The method of claim 17, wherein said electronic business card file Web site is accessible from a browser-enabled telephone.

23. The method of claim 17, wherein said electronic business card file Web site is accessible by spoken commands.

24. The method of claim 17, wherein a first format response scheme to the user comprises audio playback.

25. The method of claim 17, wherein the user can set the privacy level to Private, Semi-Private, or Public by selecting a Private icon, Semi-Private icon, or Public icon, respectively, for a corresponding field in the electronic business card file.

26. A computer system for providing access to a collection of electronic business cards, comprising computer instructions for:
  providing an electronic business card file Web site to a user;
  allowing the creation of an electronic business card file by the user using said Web site, said creation comprising:
    allowing the user to enter information into a plurality of fields in the electronic business card file;
    storing said information; and
    sending an authentication email to the user, wherein a reply to said authentication email is required to complete said creation;
  allowing the user to search for one or more records;
  allowing the user to view said records and to export electronic business card data from records in a private list of the user to a file readable by a contact management program, wherein another user associated with a record in the private list has extra privileges granted by the user;
  if said creation is completed, allowing the setting of privacy levels by the user for each said field, said setting comprising selecting one of more than two privacy levels so that the user controls data shown in each said field to another user based upon the selected privacy level for each said field, wherein the user can set the privacy level to Private, Semi-Private, or Public for each particular field in the electronic business card file;
  allowing the user to indicate a location of the user prior to an expiration date; and
  sending an electronic mail by the user to a recipient, wherein the electronic mail contains a signature hypertext link that permits the recipient to access the electronic business card file Web site in order to create a new electronic business card file for the recipient and to access information in a permitted field of the electronic business card file of the user;
  wherein the electronic business card file Web site is implemented by use of two front-end web servers and a database server that is accessed by the two front-end web servers.

27. The computer system of claim 26, wherein said electronic business card file Web site is accessible from the Internet.

28. The computer system of claim 26, wherein said electronic business card file Web site is accessible from an intranet isolated from the Internet by a firewall security device.

29. The computer system of claim 26, wherein said electronic business card file Web site is accessible from a web browser.

30. The computer system of claim 26, wherein said electronic business card file Web site is accessible from a personal digital assistant.

31. The computer system of claim 26, wherein said electronic business card file Web site is accessible from a browser-enabled telephone.

32. The computer system of claim 26, wherein said electronic business card file Web site is accessible by spoken commands.

33. The computer system of claim 26, wherein a first format response scheme to the user comprises audio playback.

34. The method of claim 26 wherein the user can set the privacy level to Private, Semi-Private, or Public by selecting a Private icon, Semi-Private icon, or Public icon, respectively, for a corresponding field in the electronic business card file.

35. A method of providing access to a collection of electronic business cards, comprising the steps of:
provide an electronic business card file Web site to a user;
allowing the creation of an electronic business card file by the user using said Web site, said creation comprising allowing the user to enter information into a plurality of fields in the electronic business card file, and storing said information; and
if said creation is completed, allowing the user to set one of a plurality of privacy levels for each of said plurality of fields in the electronic business card file, wherein the user can set the privacy level to a first privacy level or a second privacy level by selecting a first icon or second icon, respectively, for a corresponding field in the electronic business card file;
wherein the electronic business card file Web site is implemented by use of two front-end web servers and a database server that is accessed by the two front-end web servers.

36. The method of claim 35, wherein the electronic business card file Web site further includes a fail-over server that protects the database server.

37. The method of claim 35, wherein the electronic business card file Web site further includes a redundant array of inexpensive disk drives (RAID) that is accessed by the database server.

38. The method of claim 35, further comprising:
sending an authentication email to the user, wherein a reply to said authentication email is required to complete said creation.

39. The method of claim 35, further comprising:
allowing the user to search for one or more records; and
allowing the user to view said records and to export electronic business card data from records in a private list of the user to a file readable by a contact management program, wherein another user associated with a record in the private list has extra privileges granted by the user.

40. The method of claim 35, further comprising:
allowing the user to indicate a location of the user prior to an expiration date.

41. The method of claim 35, further comprising:
sending an electronic mail by the user to a recipient, wherein the electronic mail contains a signature hypertext link that permits the recipient to access the electronic business card file Web site in order to create a new electronic business card file for the recipient and to access information in a permitted field of the electronic business card file of the user.

42. The method of claim 35, wherein a privacy level permits the user to control data shown in each said field to another user of the Web site, based upon the selected privacy level for each said field.

43. The method of claim 35, wherein said electronic business card file Web site is accessible from the internet.

44. The method of claim 35, wherein said electronic business card file Web site is accessible from a web browser.

45. The method of claim 35, wherein said electronic business card file Web site is accessible from an intranet isolated from the Internet by a firewall security device.

46. The method of claim 35, wherein said electronic business card file Web site is accessible from a personal digital assistant.

47. The method of claim 35, wherein said electronic business card file Web site is accessible from a browser-enabled telephone.

48. The method of claim 35, wherein said electronic business card file Web site is accessible by spoken commands.

49. The method of claim 35, wherein a first format response scheme to the user comprises audio playback.

50. An apparatus for providing access to a collection of electronic business cards, the apparatus comprising:
an electronic business card file Web site accessible by a user;
wherein the Web site is configured to allow the user to create an electronic business card file by the user using said Web site, said creation comprising allowing the user to enter information into a plurality of fields in the electronic business card file, and storing said information; and
if said creation is completed, allowing the user to set one of a plurality of privacy levels for each of said plurality of fields in the electronic business card file, wherein the user can set the privacy level to a first privacy level or a second privacy level by selecting a first icon or second icon, respectively, for a corresponding field in the electronic business card file;
wherein the electronic business card file Web site is implemented by use of two front-end web servers and a database server that is accessed by the two front-end web servers.

51. The method of claim 50, wherein the electronic business card file Web site further includes a fail-over server that protects the database server.

52. The method of claim 50, wherein the electronic business card file Web site further includes a redundant array of inexpensive disk drives (RAID) that is accessed by the database server.

53. The apparatus of claim 50, wherein the Web site is configured to send an authentication email to the user, wherein a reply to said authentication email is required to complete said creation.

54. The apparatus of claim 50, wherein the Web site is configured to the user to search for one or more records and allow the user to view said records and to export electronic business card data from records in a private list of the user to a file readable by a contact management program, wherein another user associated with a record in the private list has extra privileges granted by the user.

55. The apparatus of claim 50, wherein the Web site is configured to allow the user to indicate a location of the user prior to an expiration date.

56. The apparatus of claim 50, wherein the Web site is configured to send an electronic mail by the user to a recipient, wherein the electronic mail contains a signature hypertext link that permits the recipient to access the electronic business card file Web site in order to create a new electronic business card file for the recipient and to access information in a permitted field of the electronic business card file of the user.

57. The apparatus of claim 50, wherein a privacy level permits the user to control data shown in each said field to another user of the Web site, based upon the selected privacy level for each said field.

58. The apparatus of claim 50, wherein said electronic business card file Web site is accessible from the internet.

59. The apparatus of claim 50, wherein said electronic business card file Web site is accessible from an intranet isolated from the Internet by a firewall security device.

60. The apparatus of claim 50, wherein said electronic business card file Web site is accessible from a web browser.

61. The apparatus of claim 50, wherein said electronic business card file Web site is accessible from a personal digital assistant.

62. The apparatus of claim 50, wherein said electronic business card file Web site is accessible from a browser-enabled telephone.

63. The apparatus of claim 50, wherein said electronic business card file Web site is accessible by spoken commands.

64. The apparatus of claim 50, wherein a first format response scheme to the user comprises audio playback.

* * * * *

UNITED STATES PATENT AND TRADEMARK OFFICE
CERTIFICATE OF CORRECTION

PATENT NO. : 6,889,213 B1
APPLICATION NO. : 09/507215
DATED : May 3, 2005
INVENTOR(S) : James G. Douvikas et al.

It is certified that error appears in the above-identified patent and that said Letters Patent is hereby corrected as shown below:

In column 4, line 20, after "servers" delete "(10A" and insert -- (110A --, therefor.

In column 12, line 26, after "warm" delete "fail-ver" and insert -- fail-over --, therefor.

In column 18, line 63, in Claim 34, after "claim 26" insert -- , --.

Signed and Sealed this

Eighth Day of September, 2009

David J. Kappos
*Director of the United States Patent and Trademark Office*